United States Patent
Sasaki et al.

(10) Patent No.: US 8,221,636 B2
(45) Date of Patent: Jul. 17, 2012

(54) METHOD OF MANUFACTURING MAGNETIC HEAD FOR PERPENDICULAR MAGNETIC RECORDING

(75) Inventors: Yoshitaka Sasaki, Milpitas, CA (US); Hiroyuki Itoh, Milpitas, CA (US); Hironori Araki, Milpitas, CA (US); Shigeki Tanemura, Milpitas, CA (US); Kazuo Ishizaki, Milpitas, CA (US); Takehiro Horinaka, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1101 days.

(21) Appl. No.: 12/149,987

(22) Filed: May 12, 2008

(65) Prior Publication Data

US 2009/0277870 A1   Nov. 12, 2009

(51) Int. Cl.
*B44C 1/22* (2006.01)
(52) U.S. Cl. ........... 216/22; 216/47; 216/66; 216/67; 360/125.03; 360/125.06; 438/689; 438/637
(58) Field of Classification Search ............ 360/125.06, 360/125.12, 125.03, 125.3, 125.38, 125.09, 360/319, 125.02, 320, 123.36, 324.2, 125.13, 360/125.56; 438/687; 216/22
See application file for complete search history.

(56) References Cited

U.S. PATENT DOCUMENTS

| 4,140,547 | A | * | 2/1979 | Shibata et al. | 438/298 |
|---|---|---|---|---|---|
| 6,710,973 | B2 | | 3/2004 | Okada et al. | |
| 2003/0151850 | A1 | | 8/2003 | Nakamura et al. | |
| 2006/0077589 | A1 | * | 4/2006 | Sasaki et al. | 360/126 |
| 2006/0270214 | A1 | * | 11/2006 | Iba | 438/637 |
| 2007/0099403 | A1 | * | 5/2007 | Shamiryan et al. | 438/513 |
| 2008/0297945 | A1 | * | 12/2008 | Han et al. | 360/125.3 |

FOREIGN PATENT DOCUMENTS

JP     A-3-104886      5/1991
JP     A-2006-107695   4/2006

OTHER PUBLICATIONS

Japanese Office Action dated Aug. 2, 2010 in Japanese Patent Application No. 2008-313457 (with translation).

* cited by examiner

*Primary Examiner* — Duy Deo
*Assistant Examiner* — Erin Flanagan
(74) *Attorney, Agent, or Firm* — Oliff & Berridge, PLC

(57) ABSTRACT

A magnetic head includes a pole layer, and an encasing layer having a groove that accommodates the pole layer. A manufacturing method for the magnetic head includes the steps of forming a nonmagnetic layer that will later undergo formation of the groove therein and will thereby become the encasing layer; forming the groove in the nonmagnetic layer so that the nonmagnetic layer becomes the encasing layer; and forming the pole layer such that the pole layer is accommodated in the groove of the encasing layer. The nonmagnetic layer is formed of $Al_2O_3$. The step of forming the groove in the nonmagnetic layer includes the step of taper-etching the nonmagnetic layer by reactive ion etching with an etching gas containing at least $BCl_3$ and $N_2$ among $BCl_3$, $Cl_2$ and $N_2$.

7 Claims, 12 Drawing Sheets

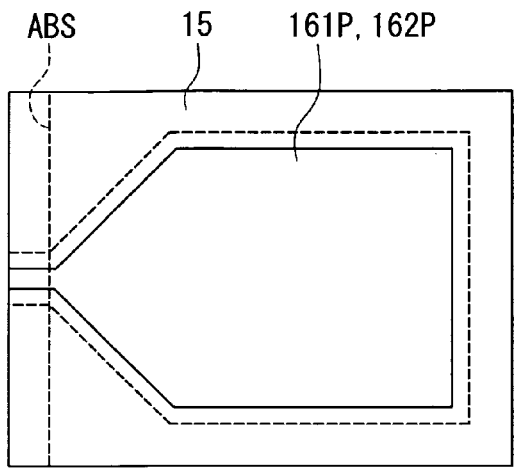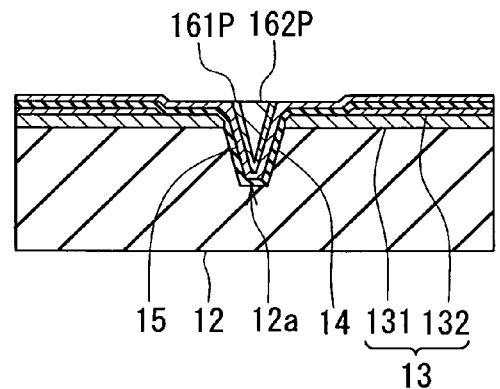
FIG. 9A  FIG. 9B
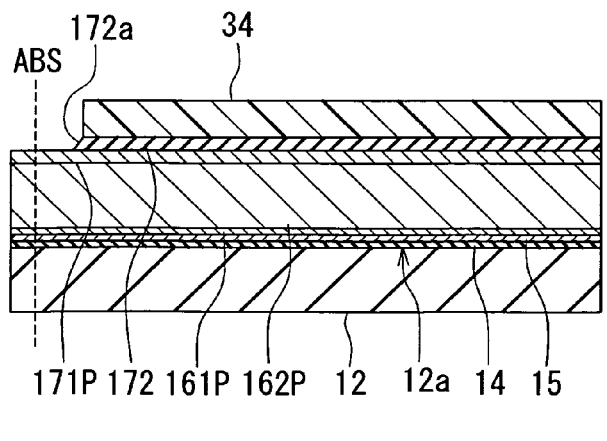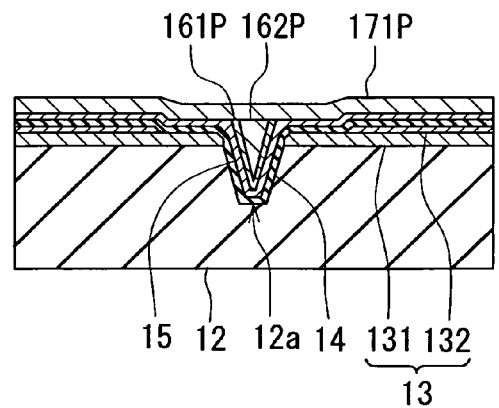
FIG. 10A  FIG. 10B

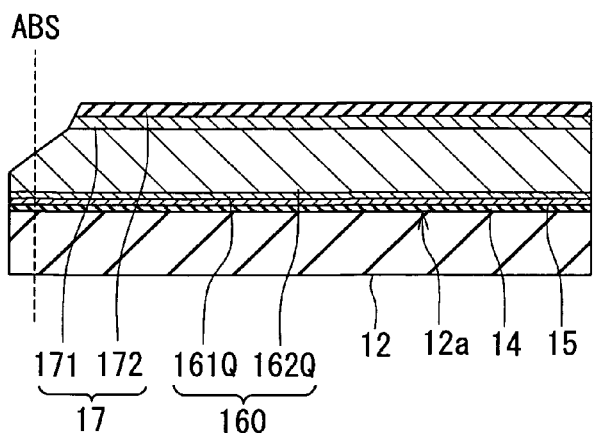 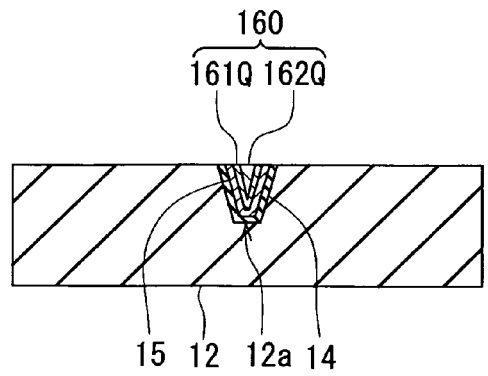
FIG. 11A  FIG. 11B
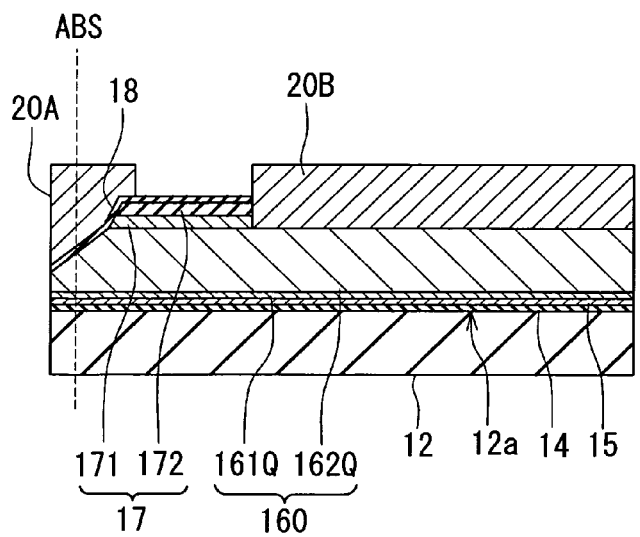 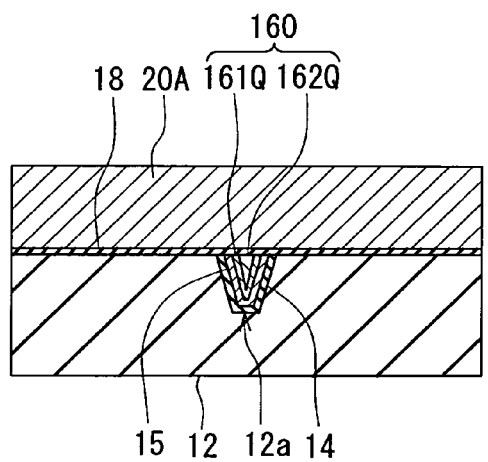
FIG. 12A  FIG. 12B

METHOD OF MANUFACTURING MAGNETIC HEAD FOR PERPENDICULAR MAGNETIC RECORDING

BACKGROUND OF THE INVENTION

1. Field of the Invention

The present invention relates to a method of manufacturing a magnetic head for perpendicular magnetic recording that is used for writing data on a (recording medium by means of a perpendicular magnetic recording system.

2. Description of the Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, as do magnetic heads for longitudinal magnetic recording, a structure in which a read head having a magnetoresistive element (hereinafter also referred to an MR element) for reading and a write head having an induction-type electromagnetic transducer for writing are stacked on a substrate. The write head includes a pole layer that generates a magnetic field in the direction perpendicular to the plane of the recording medium. The pole layer includes, for example, a track width defining portion having an end located in a medium facing surface that faces toward the recording medium, and a wide portion that is coupled to the other end of the track width defining portion and that is greater in width than the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in write characteristics that is particularly required for the write head to achieve higher recording density. On the other hand, as the track width is reduced, the write characteristics, such as overwrite property that is a parameter indicating overwriting capability, suffer degradation. It is therefore required to achieve better write characteristics as the track width is reduced.

A magnetic head for use in a magnetic disk drive such as a hard disk drive is typically provided in a slider. The slider has the medium facing surface mentioned above. The medium facing surface has an air-inflow-side end and an air-outflow-side end. The slider is designed to slightly fly over the surface of the recording medium by means of an airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs in accordance with the position of the magnetic head across the tracks.

In a magnetic disk drive of the perpendicular magnetic recording system, in particular, which exhibits better capability of writing on a recording medium compared with that of the longitudinal magnetic recording system, the occurrence of the skew mentioned above results in problems such as a phenomenon in which, when data is written on a certain track, data stored on a track adjacent thereto is erased (this phenomenon is hereinafter referred to as adjacent track erasing), and unwanted writing between two adjacent tracks. To achieve higher recording density, it is required to suppress adjacent track erasing. Unwanted writing between two adjacent tracks affects detection of servo signals for alignment of the magnetic head and the signal-to-noise ratio of a read signal.

As one of techniques for preventing the above problems resulting from the skew, there is known a technique in which the end face of the track width defining portion located in the medium facing surface is formed into such a shape that the side located backward along the direction of travel of the recording medium (that is, the side located closer to the air inflow end of the slider) is shorter than the opposite side, as disclosed in, for example, U.S. Pat. No. 6,710,973 B2, U.S. Patent Application Publication Nos. US2003/0151850 A1, and US2006/0077589 A1. In the medium facing surface of a magnetic head, typically, the end farther from the substrate is located forward along the direction of travel of the recording medium (that is, located closer to the air outflow end of the slider). Therefore, the shape of the end face of the track width defining portion located in the medium facing surface mentioned above is such that the side closer to the substrate is shorter than the side farther from the substrate.

Consideration will now be given to a method of forming a pole layer in which the end face of the track width defining portion located in the medium facing surface has such a shape that the side closer to the substrate is shorter than the side farther from the substrate, as mentioned above. U.S. Pat. No. 6,710,973 and U.S. Patent Application Publication No. US2003/0151850 A1 each disclose a method including forming a groove in an inorganic insulating film by selectively etching the inorganic insulating film using a mask made of photoresist, and forming the pole layer in this groove. U.S. Pat. No. 6,710,973 discloses that when $Al_2O_3$ is used as the material of the inorganic insulating film, $BCl_3$ or a gas mixture of $BCl_3$ and $Cl_2$ is used as an etching gas for etching the inorganic insulating film. U.S. Patent Application Publication No. US2003/0151850 A1 discloses that when $Al_2O_3$ is used as the material of the inorganic insulating film, $BCl_3$, a gas mixture of $BCl_3$ and $Cl_2$, a gas mixture of $BCl_3$ and Ar, or $BCl_3$ with $CHF_3$ added thereto is used as an etching gas for etching the inorganic insulating film.

U.S. Patent Application Publication No. US2006/0077589 A1 discloses a method including forming a nonmagnetic conductive layer on a nonmagnetic layer, forming an opening in the nonmagnetic conductive layer by selectively etching the nonmagnetic conductive layer using a mask made of photoresist, forming a groove in the nonmagnetic layer by selectively etching a portion of the nonmagnetic layer exposed from the opening of the nonmagnetic conductive layer by reactive ion etching (hereinafter also referred to as RIE), and forming the pole layer in this groove. U.S. Patent Application Publication No. US2006/0077589 A1 discloses that when $Al_2O_3$ is used as the material of the nonmagnetic layer, a gas including a first gas containing Cl or Br and a second gas containing F (fluorine) such as $CF_4$ is used as an etching gas for etching the nonmagnetic layer.

It is known that, as disclosed in U.S. Patent Application Publication No. US2006/0077589 A1, when a nonmagnetic layer made of $Al_2O_3$ is selectively etched by RIE using a mask having an opening, the use of an F-containing etching gas makes it possible to taper-etch the nonmagnetic layer such that a groove whose width decreases toward the bottom is formed in the nonmagnetic layer. The reason why the use of an F-containing etching gas makes it possible to taper-etch the nonmagnetic layer made of $Al_2O_3$ is that a sidewall-protecting film of $AlF_3$ is formed on the sidewall of the groove when the nonmagnetic layer is etched.

Typically, when a groove whose width decreases toward the bottom is formed in a layer by RIE, the greater is the value of deposition rate of the sidewall-protecting film divided by the etching rate of the groove, the greater is the angle formed by the sidewall of the groove with respect to the vertical direction (this angle is hereinafter referred to as the inclination angle of the sidewall). When a groove is formed in a nonmagnetic layer of $Al_2O_3$ by performing RIE with an F-containing etching gas, the inclination angle of the sidewall of the groove can be increased by increasing the deposition rate of the sidewall-protecting film of $AlF_3$, which is achieved by increasing the proportion of the F-containing gas in the entire etching gas.

Conventionally, when a groove for accommodating the pole layer is formed in a nonmagnetic layer by RIE, there are two problems as described below. A first problem is that, when the groove is formed in a nonmagnetic layer made of $Al_2O_3$ by performing RIE with an F-containing etching gas, increasing the proportion of the F-containing gas in the entire etching gas in order to increase the inclination angle of the sidewall of the groove results in poor flatness of the sidewall of the groove. This is presumably because the sidewall-protecting film of $AlF_3$ formed in this case is relatively thick and nonuniform. The poor flatness of the sidewall of the groove precludes precise control of the shape of the pole layer to be formed in this groove, and consequently makes it difficult to precisely control the track width and to improve the write characteristics.

A second problem is that, when the groove for accommodating the pole layer is formed in the nonmagnetic layer by RIE, the inclination angle of the sidewall of the groove greatly differs between a portion of the groove to accommodate the track width defining portion of the pole layer and a portion of the groove to accommodate the wide portion of the pole layer. In more detail, when the groove for accommodating the pole layer is formed in the nonmagnetic layer by RIE, if the etching conditions are determined so that a desired inclination angle of the sidewall can be obtained at the portion of the groove to accommodate the track width defining portion of the pole layer, the inclination angle of the sidewall obtained at the portion of the groove to accommodate the wide portion of the pole layer becomes much greater than the desired angle. This is considered to be because of the following. The opening of the mask used for etching the nonmagnetic layer is smaller in width at the portion thereof corresponding to the track width defining portion of the pole layer than at the portion thereof corresponding to the wide portion of the pole layer. As a result, at the portion of the groove to accommodate the track width defining portion of the pole layer, the supply of the etching gas is insufficient and consequently the sidewall-protecting film cannot be sufficiently deposited, which results in a smaller inclination angle of the sidewall. In contrast, at the portion of the groove to accommodate the wide portion of the pole layer, the supply of the etching gas is sufficient and consequently the sidewall-protecting film can be sufficiently deposited, which results in a greater inclination angle of the sidewall.

If the inclination angle of the sidewall becomes much greater than a desired angle at the portion of the groove to accommodate the wide portion of the pole layer, the cross section of the wide portion of the pole layer perpendicular to the direction in which magnetic flux flows will become small in area, which will result in degradation of write characteristics such as overwrite property.

For the above-described reasons, conventionally, in the case of forming a groove in a nonmagnetic layer by RIE and forming a pole layer in this groove, it has been difficult to precisely form such a pole layer that the problems resulting from the skew are prevented and improved write characteristics are provided.

OBJECT AND SUMMARY OF THE INVENTION

It is an object of the present invention to provide a method of manufacturing a magnetic head for perpendicular magnetic recording that makes it possible to precisely form a pole layer capable of preventing the problems resulting from the skew and providing improved write characteristics.

A magnetic head for perpendicular magnetic recording manufactured by a first manufacturing method of the present invention includes:

a medium facing surface that faces toward a recording medium;

a coil that generates a magnetic field corresponding to data to be written on the recording medium;

a pole layer that allows a magnetic flux corresponding to the magnetic field generated by the coil to pass and generates a write magnetic field for writing the data on the recording medium by means of a perpendicular magnetic recording system;

an encasing layer made of a nonmagnetic material and having a groove that opens at a top surface of the encasing layer and that accommodates the pole layer; and a substrate on which the encasing layer, the pole layer and the coil are stacked.

The pole layer includes a track width defining portion having an end face that is located in the medium facing surface and that defines a track width. The end face of the track width defining portion located in the medium facing surface has a width that decreases with decreasing distance from the substrate. The groove of the encasing layer includes a portion to accommodate the track width defining portion, and this portion of the groove has a width that decreases with decreasing distance from the substrate.

The first manufacturing method for the magnetic head for perpendicular magnetic recording of the present invention includes the steps of: forming a nonmagnetic layer that will later undergo formation of the groove therein and will thereby become the encasing layer; forming the groove in the nonmagnetic layer so that the nonmagnetic layer becomes the encasing layer; forming the pole layer such that the pole layer is accommodated in the groove of the encasing layer; and forming the coil.

In the first manufacturing method of the present invention, the nonmagnetic layer is formed of $Al_2O_3$. The step of forming the groove in the nonmagnetic layer includes the step of taper-etching the nonmagnetic layer by reactive ion etching with an etching gas containing at least $BCl_3$ and $N_2$ among $BCl_3$, $Cl_2$ and $N_2$ so that at least the portion of the groove of the encasing layer to accommodate the track width defining portion is formed in the nonmagnetic layer. In the etching gas, the proportions of the flow rates of $BCl_3$, $Cl_2$, and $N_2$ with respect to the entire flow rate may be 70-95%, 0-30%, and 5-20%, respectively.

A magnetic head for perpendicular magnetic recording manufactured by a second manufacturing method of the present invention includes:

a medium facing surface that faces toward a recording medium;

a coil that generates a magnetic field corresponding to data to be written on the recording medium;

a pole layer that allows a magnetic flux corresponding to the magnetic field generated by the coil to pass and generates a write magnetic field for writing the data on the recording medium by means of a perpendicular magnetic recording system;

an encasing layer made of a nonmagnetic material and having a groove that opens at a top surface of the encasing layer and that accommodates the pole layer; and a substrate on which the encasing layer, the pole layer and the coil are stacked.

The pole layer includes: a track width defining portion having an end face that is located in the medium facing surface and that defines a track width, and having an end opposite to the end face; and a wide portion connected to the end of the track width defining portion and having a width greater than that of the track width defining portion. The end face of the track width defining portion located in the medium facing surface has a width that decreases with decreasing distance from the substrate. The groove of the encasing layer includes a portion to accommodate the track width defining portion, and this portion of the groove has a width that decreases with decreasing distance from the substrate.

The second manufacturing method for the magnetic head for perpendicular magnetic recording of the present invention includes the steps of:

forming a nonmagnetic layer that will later undergo formation of the groove therein and will thereby become the encasing layer;

forming a first mask layer on the nonmagnetic layer, the first mask layer having a first opening that penetrates and that has a shape corresponding to the plane geometry of the groove to be formed later, the first mask layer being lower in etching rate than the nonmagnetic layer in reactive ion etching to be performed later on the nonmagnetic layer;

forming a second mask layer on the first mask layer, the second mask layer having a second opening that penetrates and that is wider than the first opening, the second mask layer being formed such that the first opening is exposed from the second opening;

forming the groove in the nonmagnetic layer so that the nonmagnetic layer becomes the encasing layer;

forming the pole layer such that the pole layer is accommodated in the groove of the encasing layer; and forming the coil.

In the second manufacturing method of the present invention, the step of forming the groove in the nonmagnetic layer includes the step of taper-etching a portion of the nonmagnetic layer exposed from the first and second openings by reactive ion etching so that at least the portion of the groove of the encasing layer to accommodate the track width defining portion is formed in the nonmagnetic layer.

In the second manufacturing method of the present invention, the distance between an edge of the first opening and an edge of the second opening may be within a range of 0.1 to 0.3 µm.

In the second manufacturing method of the present invention, the nonmagnetic layer is formed of $Al_2O_3$, and an etching gas containing at least $BCl_3$ and $N_2$ among $BCl_3$, $Cl_2$ and $N_2$ may be used in the step of taper-etching. In this case, in the etching gas, the proportions of the flow rates of $BCl_3$, $Cl_2$, and $N_2$ with respect to the entire flow rate may be 70-95%, 0-30%, and 5-20%, respectively.

In the second manufacturing method of the present invention, the first mask layer may be formed of a nonmagnetic metal material.

In the second manufacturing method of the present invention, the first mask layer may include a first layer and a second layer that are stacked in this order on the nonmagnetic layer, and, a portion of the second layer exposed from the second opening may be etched in the step of taper-etching. In this case, the second manufacturing method of the present invention may further include: the step of removing the second mask layer after the groove is formed; and the step of forming a nonmagnetic film made of a nonmagnetic material in the groove and on the first mask layer after removing the second mask layer but before forming the pole layer. In the step of forming the pole layer, the pole layer may be formed such that the nonmagnetic film is sandwiched between the encasing layer and the pole layer in the groove.

According to the first manufacturing method of the present invention, the nonmagnetic layer is formed of $Al_2O_3$, and the step of forming the groove in the nonmagnetic layer includes the step of taper-etching the nonmagnetic layer by reactive ion etching with an etching gas containing at least $BCl_3$ and $N_2$ among $BCl_3$, $Cl_2$ and $N_2$. This makes it possible to achieve high flatness of the sidewall of the groove thus formed. Consequently, the first manufacturing method of the invention makes it possible to precisely form a pole layer that is capable of preventing the problems resulting from the skew and capable of providing improved write characteristics.

According to the second manufacturing method of the present invention, a sufficient supply of the etching gas is secured not only at the portion of the groove to accommodate the wide portion of the pole layer but also at the portion of the groove to accommodate the track width defining portion of the pole layer. This makes it possible that, at the portion of the groove to accommodate the wide portion of the pole layer, the inclination angle of the sidewall is prevented from becoming much greater than a desired angle. Consequently, the second manufacturing method of the invention makes it possible to precisely form a pole layer that is capable of preventing the problems resulting from the skew and capable of providing improved write characteristics.

Other objects, features and advantages of the present invention will become fully apparent from the following description.

BRIEF DESCRIPTION OF THE DRAWINGS

FIG. 9A and FIG. 9B are illustrative views showing a step that follows the step of FIG. 8A to FIG. 8C.

FIG. 10A and FIG. 10B are illustrative views showing a step that follows the step of FIG. 9A and FIG. 9B.

FIG. 11A and FIG. 11B are illustrative views showing a step that follows the step of FIG. 10A and FIG. 10B.

FIG. 12A and FIG. 12B are illustrative views showing a step that follows the step of FIG. 11A and FIG. 11B.

DETAILED DESCRIPTION OF THE PREFERRED EMBODIMENT

Figure 1:
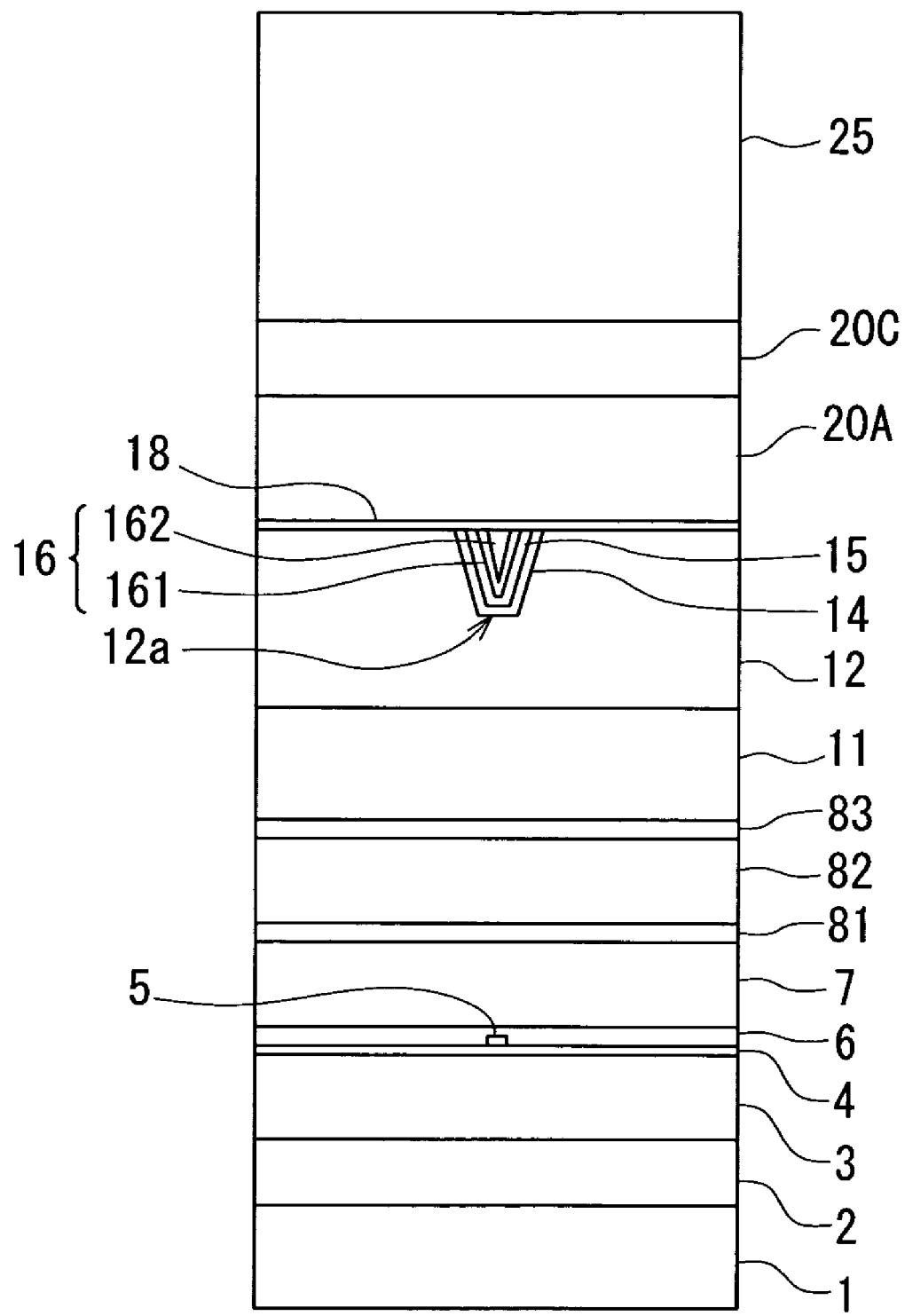
FIG. 1 is a front view of the medium facing surface of a magnetic head of an embodiment of the invention.
Figure 2:
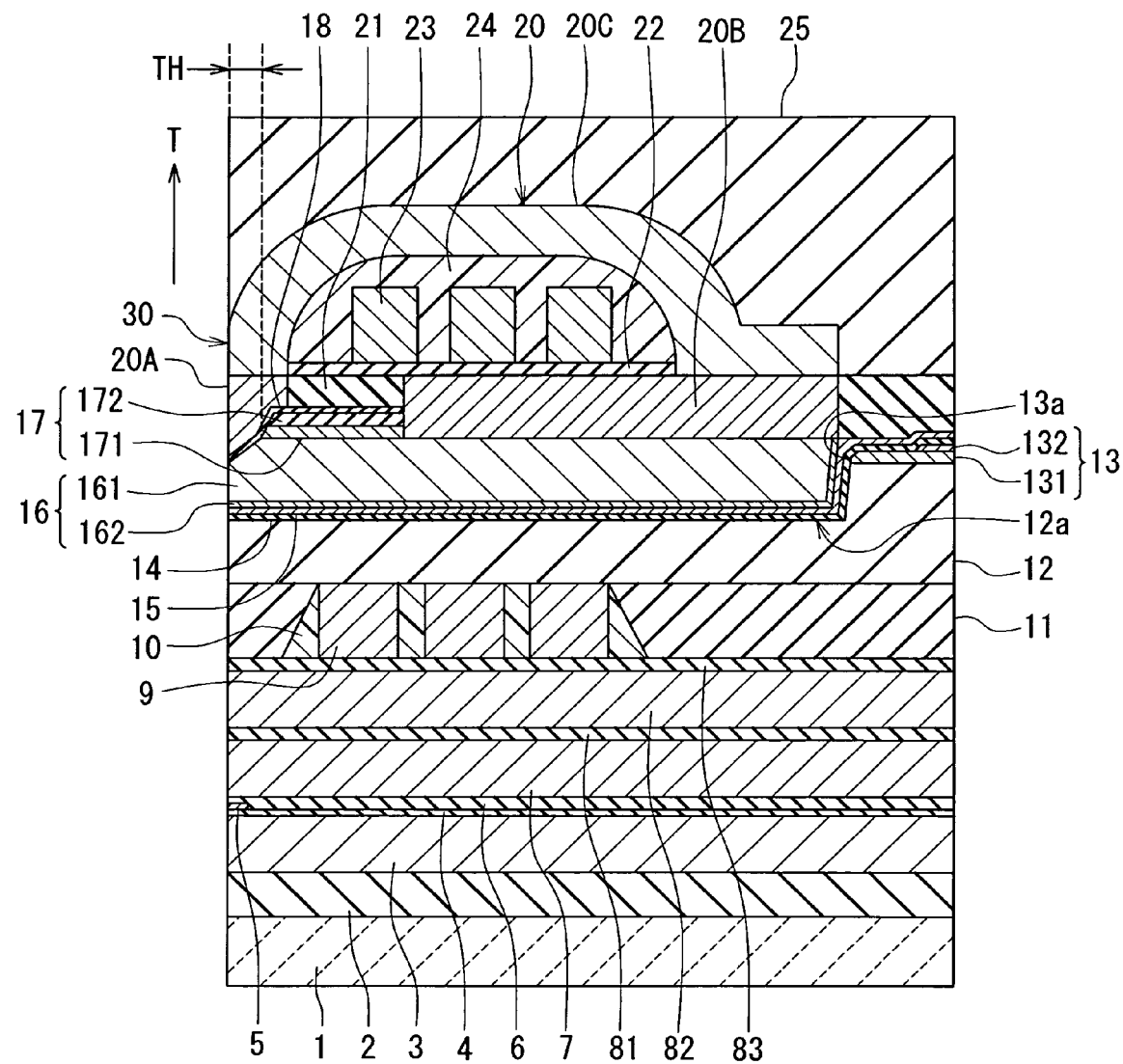
FIG. 2 is a cross-sectional view showing the configuration of the magnetic head of the embodiment of the invention.

An embodiment of the present invention will now be described in detail with reference to the drawings. Reference is first made to FIG. 1 and FIG. 2 to describe the configuration of a magnetic head for perpendicular magnetic recording of the embodiment of the invention. FIG. 1 is a front view of the medium facing surface of the magnetic head for perpendicular magnetic recording of this embodiment. FIG. 2 is a cross-sectional view showing the configuration of the magnetic head for perpendicular magnetic recording of this embodiment. FIG. 2 shows a cross section perpendicular to the medium facing surface and the top surface of the substrate. In FIG. 2 the arrow marked with T shows the direction of travel of the recording medium.

As shown in FIG. 1 and FIG. 2, the magnetic head for perpendicular magnetic recording (hereinafter simply referred to as the magnetic head) of the present embodiment includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a first top shield layer 7 made of a magnetic material and disposed on the top shield gap film 6.

An end of the MR element 5 is located in the medium facing surface 30 that faces toward the recording medium. The MR element 5 may be an element made of a magneto-sensitive film that exhibits a magnetoresistive effect, such as an AMR (anisotropic magnetoresistive) element, a GMR (giant magnetoresistive) element, or a TMR (tunneling magnetoresistive) element. The GMR element may be of a CIP (current-in-plane) type wherein a current used for detecting magnetic signals is fed in a direction nearly parallel to the planes of layers constituting the GMR element, or may be of a CPP (current-perpendicular-to-plane) type wherein a current used for detecting magnetic signals is fed in a direction nearly perpendicular to the planes of the layers constituting the GMR element.

The magnetic head further includes a nonmagnetic layer 81 and a second top shield layer 82 that are disposed in this order on the first top shield layer 7. The nonmagnetic layer 81 is made of a nonmagnetic material such as alumina. The second top shield layer 82 is made of a magnetic material. The portion from the bottom shield layer 3 to the second top shield layer 82 makes up a read head.

The magnetic head further includes: an insulating layer 83 made of an insulating material and disposed on the second top shield layer 82; a coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is planar spiral-shaped. The top surfaces of the coil 9 and the insulating layers 10 and 11 are planarized. The insulating layers 83 and 11 are made of alumina, for example. The insulating layer 10 is made of photoresist, for example. The coil 9 is made of a conductive material such as copper.

The magnetic head further includes an encasing layer 12 made of a nonmagnetic material and disposed on the planarized top surfaces of the coil 9 and the insulating layers 10 and 11. The encasing layer 12 has a groove 12a that opens at the top surface of the encasing layer 12 and that accommodates a pole layer described later. The encasing layer 12 may be made of an insulating material such as alumina, silicon oxide ($SiO_x$) or silicon oxynitride (SiON), or a nonmagnetic metal material such as Ru, Ta, Mo, Ti, W, NiCu, NiB or NiP.

The magnetic head further includes a mask layer 13 made of a nonmagnetic metal material and disposed on the top surface of the encasing layer 12. The mask layer 13 has a penetrating opening 13a, and the edge of the opening 13a is located directly on the edge of the groove 12a located at the top surface of the encasing layer 12. The mask layer 13 can be made of any of Ta, Mo, W, Ti, Ru, Rh, Re, Pt, Pd, Ir, NiCr, NiP, NiB, $WSi_2$, $TaSi_2$, $TiSi_2$, TiN, and TiW, for example.

As shown in FIG. 2, the mask layer 13 may include a first layer 131 and a second layer 132 that are stacked in this order on the encasing layer 12. In this case, the second layer 132 is formed using a material that is higher in adhesion to a nonmagnetic film 14 described later, than is a material used for the first layer 131. For example, the material for the first layer 131 may be Ru, and the material for the second layer 132 may be NiCr.

The magnetic head further includes the nonmagnetic film 14, a polishing stopper layer 15 and the pole layer 16 that are disposed in the groove 12a of the encasing layer 12 and in the opening 13a of the mask layer 13. The nonmagnetic film 14 is disposed to touch the surface of the groove 12a. The pole layer 16 is disposed apart from the surface of the groove 12a. In the groove 12a the nonmagnetic film 14 is disposed to be sandwiched between the encasing layer 12 and the pole layer 16. In the groove 12a the polishing stopper layer 15 is disposed to be sandwiched between the nonmagnetic film 14 and the pole layer 16. The pole layer 16 includes a first layer 161 located closer to the surface of the groove 12a, and a second layer 162 located farther from the surface of the groove 12a. The second layer 162 is formed by plating, for example. In this case, the first layer 161 serves as a seed layer for use for forming the second layer 162 by plating. Either the polishing stopper layer 15 or the first layer 161 may be omitted. If the first layer 161 is omitted, the polishing stopper layer 15 serves as the seed layer for use for forming the second layer 162 by plating.

The nonmagnetic film 14 is made of a nonmagnetic material. The material of the nonmagnetic film 14 may be an insulating material or a semiconductor material, for example. Examples of the insulating material usable as the material of the nonmagnetic film 14 include alumina, silicon oxide ($SiO_x$) and silicon oxynitride (SiON). Examples of the semiconductor material usable as the material of the nonmagnetic film 14 include polycrystalline silicon and amorphous silicon.

The polishing stopper layer 15 is made of a nonmagnetic metal material, for example. The material of the polishing stopper layer 15 may be the same as that of the mask layer 13.

The first layer 161 and the second layer 162 are each made of a magnetic metal material. The first layer 161 may be made of any of CoFeN, CoNiFe, NiFe and CoFe, for example. The second layer 162 may be made of any of NiFe, CoNiFe and CoFe, for example.

The magnetic head further includes a nonmagnetic layer 17 made of a nonmagnetic material and disposed on part of the top surface of the pole layer 16. The nonmagnetic layer 17 may include a layer made of an inorganic insulating material, or may include a layer made of a metal material. In the example shown in FIG. 2, the nonmagnetic layer 17 includes a first layer 171 that is made of a metal material and disposed on part of the top surface of the pole layer 16, and a second layer 172 that is made of an inorganic insulating material and disposed on the first layer 171. For example, Ru, NiCr or NiCu is used as the metal material to form the first layer 171. For example, $Al_2O_3$ or a silicon oxide is used as the inorganic insulating material to form the second layer 172. The shape of the nonmagnetic layer 17 will be described in detail later.

The magnetic head further includes a gap layer 18 disposed on the mask layer 13, the nonmagnetic film 14, the polishing stopper layer 15, the pole layer 16 and the nonmagnetic layer 17. A portion of the top surface of the pole layer 16 away from the medium facing surface 30 is not covered with the nonmagnetic layer 17 and the gap layer 18. The gap layer 18 may be made of an insulating material such as alumina or a nonmagnetic metal material such as Ru, NiCu, Ta, W, NiB or NiP.

The magnetic head further includes a shield 20. The shield 20 includes: a first layer 20A disposed on the gap layer 18; a yoke layer 20B disposed on part of the top surface of the pole layer 16 away from the medium facing surface 30; and a second layer 20C that couples the first layer 20A and the yoke layer 20B to each other. Each of the first layer 20A and the second layer 20C has an end face located in the medium facing surface 30. The first layer 20A, the yoke layer 20B and the second layer 20C are each made of a magnetic material. These layers 20A to 20C may be made of any of CoFeN, CoNiFe, NiFe and CoFe, for example.

The magnetic head further includes a nonmagnetic layer 21 made of a nonmagnetic material and disposed around the first layer 20A and the yoke layer 20B. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be, for example, a refractory metal such as Ta, Mo, Nb, W, Cr, Ru, NiCu, Pd or Hf.

The magnetic head further includes: an insulating layer 22 disposed on regions of the top surfaces of the yoke layer 20B and the nonmagnetic layer 21 above which a coil 23 described later is to be disposed; the coil 23 disposed on the insulating layer 22; and an insulating layer 24 to cover the coil 23. The insulating layer 22 is made of alumina, for example. The coil 23 is planar spiral-shaped. Part of the coil 23 passes between the second layer 20C and the yoke layer 20B. The coil 23 is made of a conductive material such as copper. The insulating layer 24 is made of photoresist, for example. The magnetic head further includes a protection layer 25 made of an insulating material such as alumina and disposed to cover the second layer 20C. The portion from the coil 9 to the second layer 20C of the shield 20 makes up a write head.

As described so far, the magnetic head of the present embodiment includes the medium facing surface 30 that faces toward the recording medium, the read head, and the write head. The read head and the write head are stacked on the substrate 1. The read head is disposed backward along the direction T of travel of the recording medium (that is, disposed closer to the air inflow end of the slider), while the write head is disposed forward along the direction T of travel of the recording medium (that is, disposed closer to the air outflow end of the slider).

The read head includes: the MR element 5 as the read element; the bottom shield layer 3 and the top shield layer 7 for shielding the MR element 5, portions of the shield layers 3 and 7 closer to the medium facing surface 30 being opposed to each other with the MR element 5 located in between; the bottom shield gap film 4 disposed between the MR element 5 and the bottom shield layer 3; and the top shield gap film 6 disposed between the MR element 5 and the top shield layer 7.

The write head includes the coil 9, the encasing layer 12, the mask layer 13, the nonmagnetic film 14, the polishing stopper layer 15, the pole layer 16, the nonmagnetic layer 17, the gap layer 18, the shield 20, and the coil 23. The coils 9 and 23 generate a magnetic field corresponding to data to be written on the recording medium. The coil 9 is not an essential component of the write head and may be dispensed with. The nonmagnetic film 14 may also be dispensed with.

The pole layer 16 has an end face located in the medium facing surface 30, and a top surface that is farther from the substrate 1. The pole layer 16 allows a magnetic flux corresponding to the magnetic field generated by the coil 23 to pass and generates a write magnetic field for writing the data on the recording medium by means of the perpendicular magnetic recording system.

The shield 20 has an end face located in the medium facing surface 30, and is coupled to a portion of the pole layer 16 away from the medium facing surface 30. The pole layer 16 is located closer to the substrate 1 than is the shield 20. The gap layer 18 is made of a nonmagnetic material, has an end face located in the medium facing surface 30, and is provided between the pole layer 16 and the shield 20.

In the medium facing surface 30, the end face of the shield 20 is disposed forward of the end face of the pole layer 16 along the direction T of travel of the recording medium, with a predetermined distance provided therebetween by the thickness of the gap layer 18. The thickness of the gap layer 18 is within a range of 25 to 45 nm, for example. The coil 23 includes a portion that passes through the space surrounded by the pole layer 16 and the shield 20.

The pole layer 16 is disposed in the groove 12a of the encasing layer 12 and in the opening 13a of the mask layer 13, with the nonmagnetic film 14 and the polishing stopper layer 15 disposed between the pole layer 16 and each of the groove 12a and the opening 13a. The nonmagnetic film 14 has a thickness within a range of 10 to 50 nm, for example. However, the thickness of the nonmagnetic film 14 is not limited to this range and can be appropriately chosen according to the track width. The polishing stopper layer 15 has a thickness within a range of 40 to 60 nm, for example.

The pole layer 16 includes the first layer 161 located closer to the surface of the groove 12a, and the second layer 162 located farther from the surface of the groove 12a. The first layer 161 has a thickness within a range of 0 to 100 nm, for example. The zero thickness of the first layer 161 means that the first layer 161 is not provided.

The shield 20 includes the first layer 20A disposed adjacent to the gap layer 18, the yoke layer 20B disposed on part of the top surface of the pole layer 16 away from the medium facing surface 30, and the second layer 20C that couples the first layer 20A and the yoke layer 20B to each other. The second layer 20C includes a portion located on a side of a portion of the coil 23 covered with the insulating layer 24, the side being farther from the pole layer 16.

Figure 3:
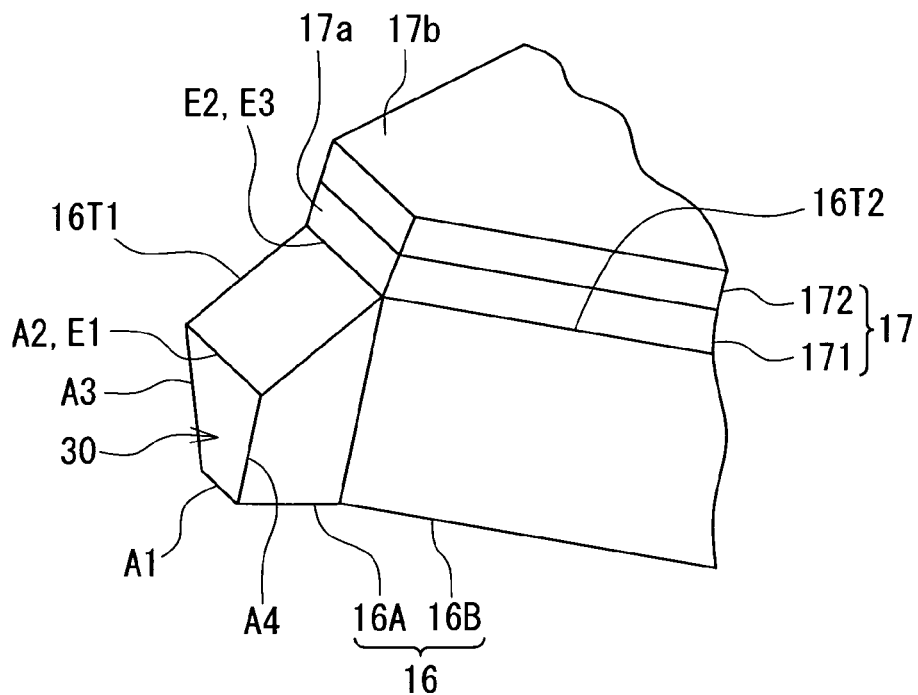
FIG. 3 is a perspective view showing respective portions of a pole layer and a nonmagnetic layer of the magnetic head of the embodiment of the invention, the portions being located near the medium facing surface.

Reference is now made to FIG. 3 to describe the shapes of the pole layer 16 and the nonmagnetic layer 17 in detail. FIG. 3 is a perspective view showing the respective portions of the pole layer 16 and the nonmagnetic layer 17 near the medium facing surface 30. As shown in FIG. 3, the end face of the pole layer 16 located in the medium facing surface 30 has: a first side A1 closest to the substrate 1; a second side A2 opposite to the first side A1; a third side A3 connecting an end of the first side A1 and an end of the second side A2 to each other; and a fourth side A4 connecting the other end of the first side A1 and the other end of the second side A2 to each other. The second side A2 defines the track width. The end face of the pole layer 16 located in the medium facing surface 30 has a width that decreases with decreasing distance from the first side A1, i.e., with decreasing distance from the substrate 1. Each of the third side A3 and the fourth side A4 forms an angle of, for example, 9 to 15 degrees, with respect to the direction perpendicular to the top surface of the substrate 1. The length of the second side A2, that is, the track width, is within a range of 0.05 to 0.20 μm, for example.

Furthermore, the top surface of the pole layer 16 includes: a first portion 16T1 having a first edge E1 located in the medium facing surface 30 and a second edge E2 opposite thereto; and a second portion 16T2 located farther from the medium facing surface 30 than the first portion 16T1 and connected to the first portion 16T1 at the second edge E2. The first edge E1 coincides with the second side A2.

The distance from the substrate 1 to any point on the first portion 16T1 increases with increasing distance from the medium facing surface 30 to the point. The first portion 16T1 forms an angle of, for example, 30 to 55 degrees, with respect to the direction perpendicular to the medium facing surface 30. The second portion 16T2 extends in a direction substantially perpendicular to the medium facing surface 30. The bottom surface of the pole layer 16 is flat and extends in a direction substantially perpendicular to the medium facing surface 30.

The nonmagnetic layer 17 is disposed on the second portion 16T2. The nonmagnetic layer 17 has a bottom surface touching the second portion 16T2, and this bottom surface has an edge E3 located at the second edge E2. In the example shown in FIG. 3, the nonmagnetic layer 17 includes the first layer 171 made of a metal material and disposed on part of the top surface of the pole layer 16, and the second layer 172 made of an inorganic insulating material and disposed on the first layer 171. The first layer 171 has a thickness within a range of 50 to 150 nm, for example, and the second layer 172 has a thickness within a range of 60 to 120 nm, for example. The nonmagnetic layer 17 may consist of a single layer made of a metal material, or a single layer made of an inorganic insulating material.

The nonmagnetic layer 17 has a front end face 17a that faces toward the medium facing surface 30, and a top surface 17b that is farther from the substrate 1. Each of the front end face 17a and the top surface 17b is a flat surface. In the present embodiment, the distance from the medium facing surface 30 to any point on the front end face 17a increases with increasing distance from the substrate 1 to the point. The front end face 17a forms an angle of, for example, 45 to 75 degrees, with respect to the direction perpendicular to the medium facing surface 30.

The gap layer 18 is disposed to cover the first portion 16T1 of the top surface of the pole layer 16, and also to cover the front end face 17a and the top surface 17b of the nonmagnetic layer 17.

The first layer 20A of the shield 20 has a bottom surface touching the gap layer 18. The bottom surface of the first layer 20A bends to be opposed to the pole layer 16 and the nonmagnetic layer 17 with the gap layer 18 located in between. The distance between the bottom surface of the first layer 20A and the second portion 16T2 is greater than the distance between the bottom surface of the first layer 20A and the first portion 16T1.

In the present embodiment, throat height TH is equal to the distance between the edge E3 of the bottom surface of the nonmagnetic layer 17 and the medium facing surface 30, that is, equal to the distance between the second edge E2 and the medium facing surface 30. The throat height TH is within a range of 0.1 to 0.2 μm, for example.

In the portion of the first layer 20A of the shield 20 that is located above the pole layer 16, the minimum distance between the end face located in the medium facing surface 30 and the end face opposite thereto is within a range of 0.20 to 0.25 μm, for example. The first layer 20A has a thickness within a range of 0.45 to 0.85 μm, for example.

Figure 4:
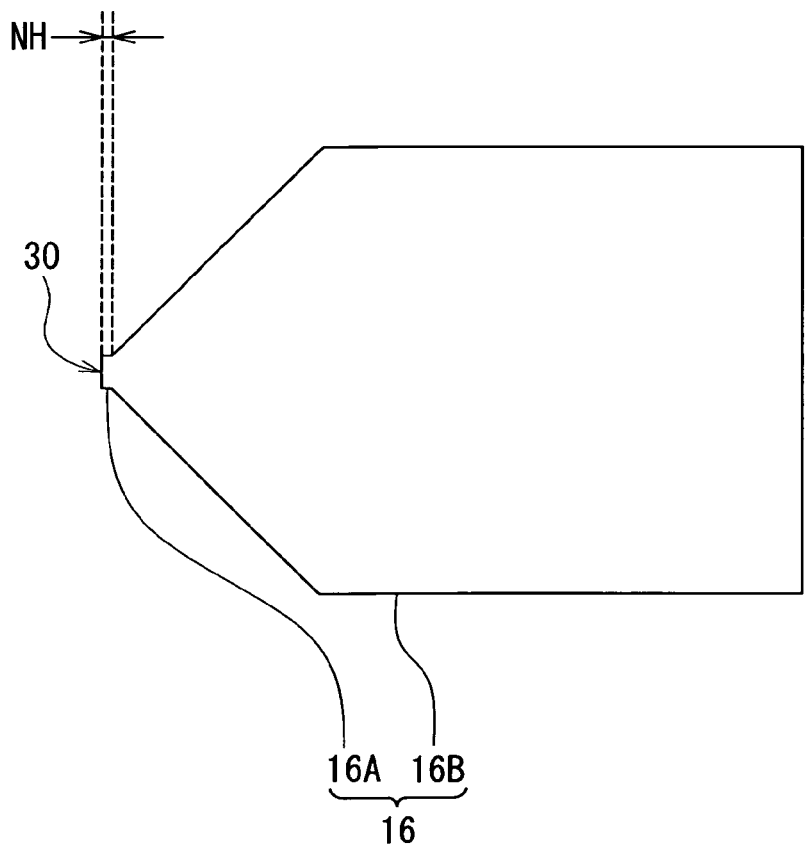
FIG. 4 is a top view of the pole layer of the magnetic head of the embodiment of the invention.

FIG. 4 is a top view of the pole layer 16. As shown in FIG. 4, the pole layer 16 includes: a track width defining portion 16A having an end face that is located in the medium facing surface 30 and that defines track width, and having an end opposite to the end face; and a wide portion 16B connected to the end of the track width defining portion 16A and having a width greater than that of the track width defining portion 16A. The track width defining portion 16A has a width that does not change in accordance with the distance from the medium facing surface 30. For example, the wide portion 16B is equal in width to the track width defining portion 16A at the boundary with the track width defining portion 16A, and gradually increases in width with increasing distance from the medium facing surface 30 and then maintains a specific width to the end of the wide portion 16B. In the present embodiment, the track width defining portion 16A is a portion of the pole layer 16 from the end face located in the medium facing surface 30 to the point at which the width of the pole layer 16 starts to increase. Here, the length of the track width defining portion 16A taken in the direction perpendicular to the medium facing surface 30 is called a neck height NH. The neck height NH is within a range of 0.1 to 0.3 μm, for example.

The end face of the track width defining portion 16A located in the medium facing surface 30 has a width that decreases with decreasing distance from the substrate 1. Of the groove 12a of the encasing layer 12, at least a portion to accommodate the track width defining portion 16A has a width that decreases with decreasing distance from the substrate 1.

FIG. 3 shows an example in which the distance from the medium facing surface 30 to the second edge E2 of the first portion 16T1 of the top surface of the pole layer 16 is equal to the distance from the medium facing surface 30 to the boundary between the track width defining portion 16A and the wide portion 16B, i.e., the neck height NH. However, the distance from the medium facing surface 30 to the edge E2 may be smaller or greater than the distance from the medium facing surface 30 to the boundary between the track width defining portion 16A and the wide portion 16B, i.e., the neck height NH. In addition, the throat height TH may be equal to the neck height NH, or may be smaller or greater than the neck height NH.

Reference is now made to FIG. 5A to FIG. 13B to describe a method of manufacturing the magnetic head of the present embodiment. Each of FIG. 5A to FIG. 13B shows a stack of layers formed in the process of manufacture of the magnetic head. The portions closer to the substrate 1 than is the encasing layer 12 are omitted in FIG. 5A to FIG. 13B.

In the method of manufacturing the magnetic head of the embodiment, first, as shown in FIG. 2, the insulating layer 2, the bottom shield layer 3 and the bottom shield gap film 4 are formed in this order on the substrate 1. Next, the MR element 5 and leads (not shown) connected to the MR element 5 are formed on the bottom shield gap film 4. Next, the MR element 5 and the leads are covered with the top shield gap film 6. Next, the top shield layer 7, the nonmagnetic layer 81, the second top shield layer 82 and the insulating layer 83 are formed in this order on the top shield gap film 6. Next, the coil 9 and the insulating layers 10 and 11 are formed on the insulating layer 83. Next, the top surfaces of the coil 9 and the insulating layers 10 and 11 are planarized by, for example, chemical mechanical polishing (hereinafter referred to as CMP).

Figure 5A:
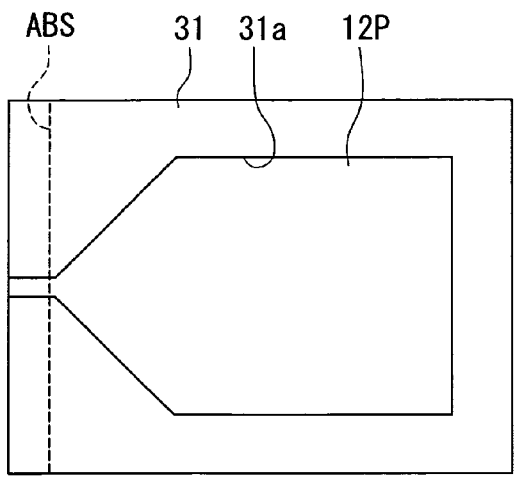
FIG. 5A and FIG. 5B are illustrative views showing a step of a method of manufacturing the magnetic head of the embodiment of the invention.
Figure 5B:
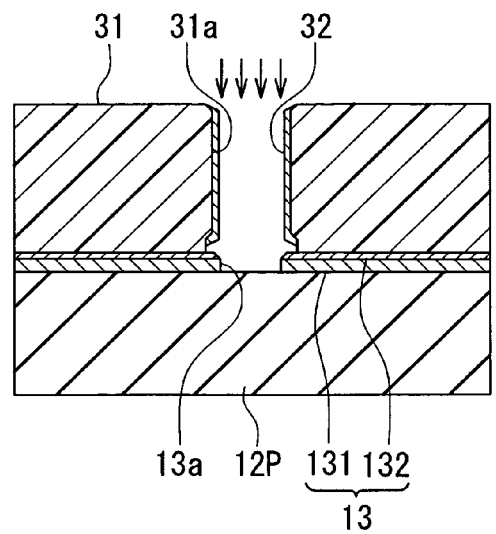

FIG. 5A and FIG. 5B show the next step. FIG. 5A shows the top surface of a stack of layers formed in the process of manufacture of the magnetic head. In FIG. 5A and other drawing figures, "ABS" indicates an imaginary plane located at the target position of the medium facing surface 30. FIG. 5B shows a cross section of the stack of FIG. 5A taken at the imaginary plane ABS. In this step, first, a nonmagnetic layer 12P is formed on the planarized top surfaces of the coil 9 and the insulating layers 10 and 11. The nonmagnetic layer 12P will later undergo formation of the groove 12a therein and will thereby become the encasing layer 12. Next, a first film and a second film that will later become the first layer 131 and the second layer 132 of the mask layer 13, respectively, are formed in this order on the nonmagnetic layer 12P by sputtering, for example. Here, by way of example, the first film is formed of Ru and 60 nm thick, and the second film is formed of NiCr and 20 nm thick.

Next, a photoresist layer having a thickness of, for example, 1.0 μm, is formed on the second film. This photoresist layer is then patterned by photolithography to thereby form a photoresist mask 31 to be used for forming an opening that penetrates through the first and second films. The photoresist mask 31 has an opening 31a that has a shape corresponding to the plane geometry of the groove 12a to be formed later.

Next, the first and second films are selectively etched using the photoresist mask 31. As a result, the first film becomes the first layer 131 and the second film becomes the second layer 132, whereby the mask layer 13 having the penetrating opening 13a is formed. The opening 13a has a shape corresponding to the plane geometry of the groove 12a to be formed later. The mask layer 13 corresponds to the first mask layer of the present invention, and the opening 13a corresponds to the first opening of the present invention.

The etching of the first and second films is performed by ion beam etching (hereinafter referred to as IBE), for example. In this case, the direction of travel of ion beams shall form an angle of, for example, zero degree to 7 degrees, with respect to the direction perpendicular to the top surface of the substrate 1. Numeral 32 in FIG. 5B indicates a deposition layer formed by substances that flew off due to the etching of the first and second films and have adhered to the sidewall of the opening 31a of the photoresist mask 31. Next, the photoresist mask 31 is removed.

Figure 6A:
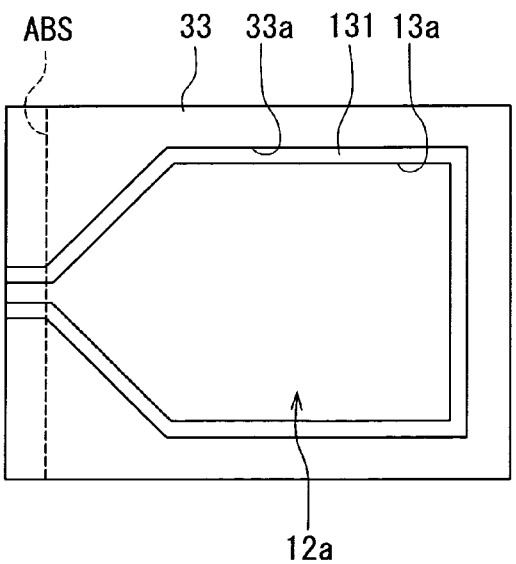
FIG. 6A and FIG. 6B are illustrative views showing a step that follows the step of FIG. 5A and FIG. 5B.
Figure 6B:
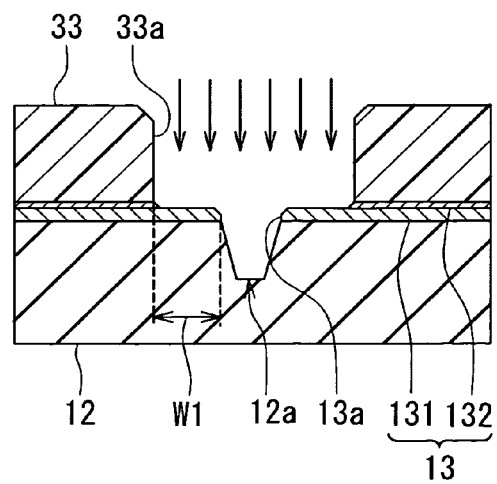

FIG. 6A and FIG. 6B show the next step. FIG. 6A shows the top surface of a stack of layers formed in the process of manufacture of the magnetic head. FIG. 6B shows a cross section of the stack of FIG. 6A taken at the imaginary plane ABS. In this step, first, a photoresist layer having a thickness of, for example, 0.7 μm, is formed over the entire top surface of the stack. Next, this photoresist layer is patterned by photolithography to thereby form a mask layer 33. The mask layer 33 has an opening 33a that penetrates and that is wider than the opening 13a of the mask layer 13. The mask layer 33 is formed on the mask layer 13 such that the opening 13a is exposed from the opening 33a. The mask layer 33 corresponds to the second mask layer of the present invention, and the opening 33a corresponds to the second opening of the present invention. The distance W1 between the edge of the opening 13a and the edge of the opening 33a is preferably within a range of 0.1 to 0.3 μm.

Next, the groove 12a is formed in the nonmagnetic layer 12P so that the nonmagnetic layer 12P becomes the encasing layer 12. The step of forming the groove 12a includes the step of taper-etching a portion of the nonmagnetic layer 12P exposed from the openings 13a and 33a by reactive ion etching (hereinafter referred to as RIE) so that at least the portion of the groove 12a to accommodate the track width defining portion 16A is formed in the nonmagnetic layer 12P. The step of forming the groove 12a may consist only of the step of taper-etching the nonmagnetic layer 12P. In this case, the groove 12a is completed by the step of taper-etching the nonmagnetic layer 12P. The step of forming the groove 12a may include another etching step that is performed after the step of taper-etching the nonmagnetic layer 12P. An example of such another etching step is a step of further etching the groove that has been formed in the nonmagnetic layer 12P by the step of taper-etching the nonmagnetic layer 12P, except the portion to accommodate the track width defining portion 16A, and thereby completing the groove 12a.

Next, the mask layer 33 is removed. As a result of the formation of the groove 12a, the nonmagnetic layer 12P becomes the encasing layer 12. The edge of the opening 13a of the mask layer 13 is located directly on the edge of the groove 12a located at the top surface of the encasing layer 12. The step of taper-etching the nonmagnetic layer 12P by RIE is performed so that the sidewall of the portion of the groove 12a to accommodate the track width defining portion 16A forms an angle with respect to the direction perpendicular to the top surface of the substrate 1 (the angle is hereinafter referred to as the inclination angle of the sidewall), the angle falling within a range of, for example, 9 to 15 degrees.

According to the present embodiment, in the case where the nonmagnetic layer 12P is made of alumina ($Al_2O_3$), an etching gas containing at least $BCl_3$ and $N_2$ among $BCl_3$, $Cl_2$ and $N_2$ is used in the step of taper-etching the nonmagnetic layer 12P by RIE. $BCl_3$ and $Cl_2$ are main components that contribute to the etching of the nonmagnetic layer 12P. $N_2$ is a gas for forming, during etching of the nonmagnetic layer 12P, a sidewall-protecting film on the sidewall of the groove formed by the etching. When the nonmagnetic layer 12P of alumina is etched by RIE using an etching gas containing $BCl_3$ and $N_2$, a reaction product containing at least one of BN (boron nitride) and AlN (aluminum nitride) is produced during the etching reaction of alumina. This reaction product adheres to the sidewall of the groove and thereby forms the sidewall-protecting film. The formation of the sidewall-protecting film serves to accomplish taper-etching of the nonmagnetic layer 12P. In the above etching gas, the proportions of the flow rates of $BCl_3$, $Cl_2$ and $N_2$ with respect to the entire flow rate are preferably 70-95%, 0-30% and 5-20%, respectively.

Here is given an example of conditions other than the etching gas to be employed for the step of taper-etching the nonmagnetic layer 12P by RIE. This example uses an RIE apparatus that generates plasma in a chamber by electromagnetic induction using a high frequency coil, with source power to be supplied to the high frequency coil set to 1200 W, high frequency bias power set to 25 W, and pressure in the chamber set to 0.3 Pa.

In the present embodiment, the material of the mask layer 13 is selected so that the etching rate for the mask layer 13 in RIE to be performed on the nonmagnetic layer 12P will be lower than the etching rate for the nonmagnetic layer 12P.

In the present embodiment, in the step of taper-etching the nonmagnetic layer 12P by RIE, a portion of the second layer 132 of the mask layer 13 exposed from the opening 33a of the mask layer 33 may be etched. However, the portion of the mask layer 13 exposed from the opening 33a of the mask layer 33 should be allowed to remain at least partly in the thickness direction. When the first layer 131 of the mask layer 13 is made of Ru, it is hardly etched by RIE performed under the above-mentioned conditions.

Figure 7A:
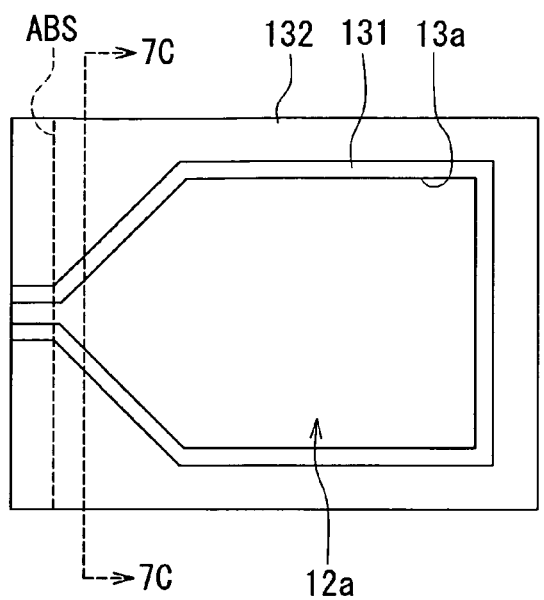
FIG. 7A to FIG. 7C are illustrative views showing a step that follows the step of FIG. 6A and FIG. 6B.
Figure 7B:
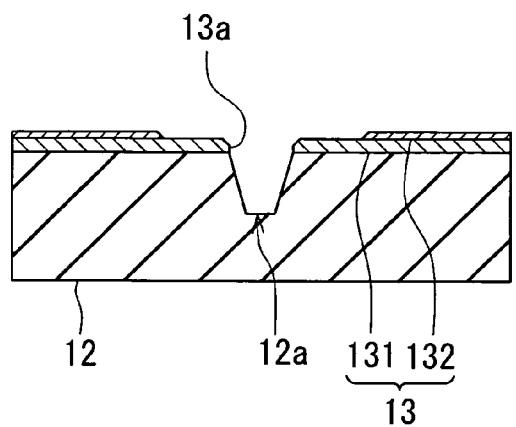
Figure 7C:
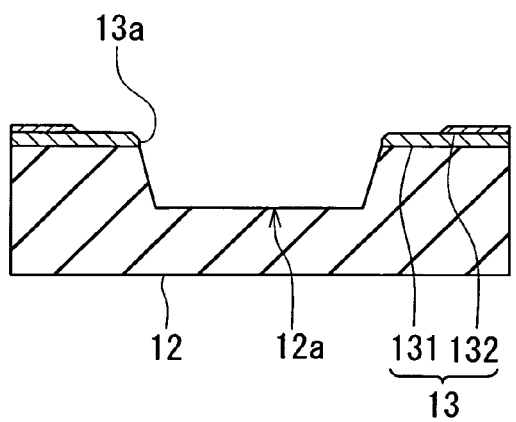

FIG. 7A to FIG. 7C show the next step. FIG. 7A shows the top surface of a stack of layers formed in the process of manufacture of the magnetic head. FIG. 7B shows a cross section of the stack of FIG. 7A taken at the imaginary plane ABS. FIG. 7C shows a cross section of the stack of FIG. 7A taken along line 7C-7C. In this step, the mask layer 33 is removed. As shown in FIG. 7A to FIG. 7C, the groove 12a includes a smaller-width portion to accommodate the track width defining portion 16A of the pole layer 16, and a greater-width portion to accommodate the wide portion 16B of the pole layer 16.

Figure 8A:
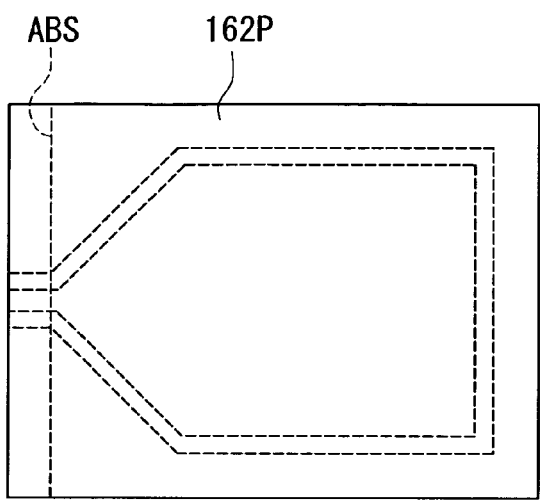
FIG. 8A to FIG. 8C are illustrative views showing a step that follows the step of FIG. 7A to FIG. 7C.
Figure 8B:
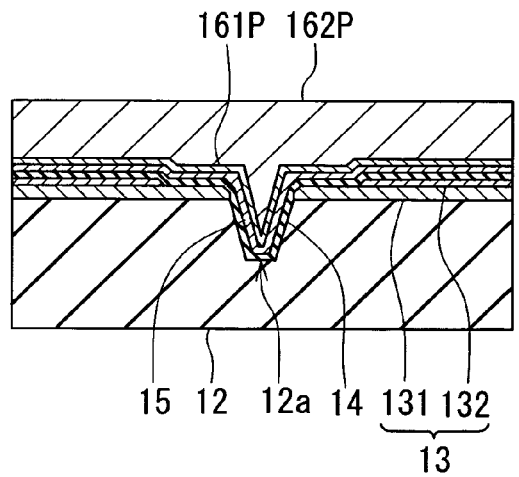
Figure 8C:
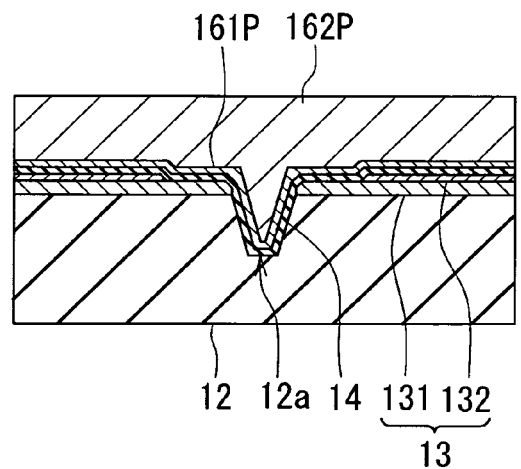

FIG. 8A to FIG. 8C show the next step. FIG. 8A shows the top surface of a stack of layers formed in the process of manufacture of the magnetic head. FIG. 8B shows a cross section of the stack of FIG. 8A taken at the imaginary plane ABS. FIG. 8C shows a cross section of a modification example of the stack taken at the imaginary plane ABS. In this step, first, the nonmagnetic film 14 is formed in the groove 12a of the encasing layer 12 and on the mask layer 13. The nonmagnetic film 14 is formed by sputtering or chemical vapor deposition (hereinafter referred to as CVD), for example. The thickness of the nonmagnetic film 14 is precisely controllable. In the case of forming the nonmagnetic film 14 by CVD, it is preferred to employ, in particular, so-called atomic layer CVD (hereinafter referred to as ALCVD) in which formation of a single atomic layer is repeated. In this case, it is possible to control the thickness of the nonmagnetic film 14 with higher precision. In the case of forming the nonmagnetic film 14 by ALCVD, it is preferable to use alumina, in particular, as the material of the nonmagnetic film 14. In the case of using a semiconductor material to form the nonmagnetic film 14, it is preferred that the nonmagnetic film 14 be formed by ALCVD at low temperatures (around 200° C.) or by low-pressure CVD at low temperatures. The semiconductor material to be used as the material of the nonmagnetic film 14 is preferably undoped polycrystalline silicon or amorphous silicon.

Next, the polishing stopper layer 15 is formed on the nonmagnetic film 14 by sputtering or ALCVD, for example. The polishing stopper layer 15 is also formed in the groove 12a of the encasing layer 12. The polishing stopper layer 15 indicates the level where to stop polishing in a polishing step to be performed later.

Next, a first magnetic layer 161P that will later become the first layer 161 of the pole layer 16 is formed on the polishing stopper layer 15. The first magnetic layer 161P is formed by sputtering or ion beam deposition, for example. In the case of forming the first magnetic layer 161P by sputtering, it is preferred to employ collimation sputtering or long throw sputtering. It should be noted that, since the first layer 161 can be dispensed with as previously mentioned, it is not necessarily required to form the first magnetic layer 161P.

Next, a second magnetic layer 162P that will later become the second layer 162 of the pole layer 16 is formed on the first magnetic layer 161P. The second magnetic layer 162P is formed such that the top surface thereof is located higher than the top surfaces of the mask layer 13, the nonmagnetic film 14 and the polishing stopper layer 15. The second magnetic layer 162P is formed by frame plating, for example. In this case, the first magnetic layer 161P is used as an electrode for plating. In the case where the polishing stopper layer 15 is made of a conductive material, the layer 15 is also used as an electrode for plating. The second magnetic layer 162P may be formed by making an unpatterned plating layer and then patterning this plating layer through etching.

Since the polishing stopper layer 15 can be dispensed with as previously mentioned, it is not necessarily required to form the polishing stopper layer 15. FIG. 8C shows a modification example of the stack that is obtained by forming the first magnetic layer 161P and the second magnetic layer 162P in this order on the nonmagnetic film 14, without forming the polishing stopper layer 15.

FIG. 9A and FIG. 9B show the next step. FIG. 9A shows the top surface of a stack of layers formed in the process of manufacture of the magnetic head. FIG. 9B shows a cross section of the stack of FIG. 9A taken at the imaginary plane ABS. In this step, first, a coating layer (not shown) made of, for example, alumina, is formed to a thickness of 0.5 to 1.2 µm, for example, over the entire top surface of the stack. Next, the coating layer, the second magnetic layer 162P and the first magnetic layer 161P are polished by, for example, CMP, until the polishing stopper layer 15 becomes exposed. When CMP is employed to polish the coating layer, the second magnetic layer 162P and the first magnetic layer 161P, such a slurry is used that polishing is stopped when the polishing stopper layer 15 becomes exposed, such as an alumina-base slurry. In the case where the polishing stopper layer 15 is not formed as shown in FIG. 8C, the coating layer, the second magnetic layer 162P and the first magnetic layer 161P are polished until the mask layer 13 becomes exposed.

FIG. 10A and FIG. 10B show the next step. FIG. 10A shows a cross section of a stack of layers formed in the process of manufacture of the magnetic head, the cross section being perpendicular to the medium facing surface and the substrate. FIG. 10B shows a cross section of the stack of FIG. 10A taken at the imaginary plane ABS. In this step, first, a first film 171P is formed by, for example, sputtering, over the entire top surface of the stack including the top surfaces of the first magnetic layer 161P and the second magnetic layer 162P. The first film 171P will be partially etched later and will thereby become the first layer 171 of the nonmagnetic layer 17. Next, a second film is formed on the film 171P by sputtering, for example. The second film will be partially etched later and will thereby become the second layer 172 of the nonmagnetic layer 17. Next, a photoresist layer having a thickness of, for example, 1.0 µm, is formed on the second film. Next, this photoresist layer is patterned by photolithography to thereby form a mask 34 to be used for patterning the second film.

Next, a portion of the second film is etched by, for example, RIE, using the mask 34. When RIE is employed to etch the second film, an etching gas containing $BCl_3$, $Cl_2$ and $CF_4$, for example, is used. Here, by way of example, the second film is etched using an etching gas containing 80 sccm of $BCl_3$, 15 sccm of $Cl_2$, and 18 sccm of $CF_4$. By undergoing the etching of the portion thereof, the second film becomes the second layer 172. In the step of etching the portion of the second film, a front end face 172a is formed near an end of the second layer 172 closest to the plane ABS. The distance from the medium facing surface 30 to any point on the front end face 172a increases with increasing distance from the substrate 1 to the point. The front end face 172a preferably forms an angle of 45 to 75 degrees with respect to the direction perpendicular to the medium facing surface 30. The angle to be formed by the front end face 172a with respect to the direction perpendicular to the medium facing surface 30 can be controlled by the conditions for etching the second film by RIE. Next, the mask 34 is removed.

FIG. 11A and FIG. 11B show the next step. FIG. 11A shows a cross section of a stack of layers formed in the process of manufacture of the magnetic head, the cross section being perpendicular to the medium facing surface and the substrate. FIG. 11B shows a cross section of the stack of FIG. 11A taken at the imaginary plane ABS. In this step, first, a portion of the first film 171P is etched by, for example, IBE, using the second layer 172 as a mask. As a result, the first film 171P becomes the first layer 171, whereby the nonmagnetic layer 17 having the first layer 171 and the second layer 172 is formed.

Next, a portion of each of the magnetic layers 161P and 162P is etched by, for example, IBE, using the nonmagnetic layer 17 as a mask. Hereinafter, the magnetic layers 161P and 162P having undergone this etching are referred to as magnetic layers 161Q and 162Q, respectively. A combination of the magnetic layers 161Q and 162Q is referred to as a magnetic layer 160. The etching of the first film 171P and the etching of the magnetic layers 161P and 162P are performed successively.

The etching of the portion of each of the magnetic layers 161P and 162P is performed such that the direction of travel of an ion beam forms an angle of 45 to 55 degrees with respect to the direction perpendicular to the top surface of the substrate 1, and that the direction of travel of the ion beam rotates as seen in the direction perpendicular to the top surface of the substrate 1. By performing IBE in such a manner, a slope corresponding to the first portion 16T1 of the top surface of the pole layer 16 is formed in the top surfaces of the magnetic layers 161P and 162P.

FIG. 12A and FIG. 12B show the next step. FIG. 12A shows a cross section of a stack of layers formed in the process of manufacture of the magnetic head, the cross section being perpendicular to the medium facing surface and the substrate. FIG. 12B shows a cross section of the stack of FIG. 12A taken at the imaginary plane ABS. In this step, first, the gap layer 18 is formed over the entire top surface of the stack. The gap layer 18 is formed by sputtering or CVD, for example. In the case of forming the gap layer 18 by CVD, it is preferred to employ ALCVD, in particular. In the case of forming the gap layer 18 by ALCVD, it is preferred to use alumina, in particular, as the material of the gap layer 18. If formed by ALCVD, the gap layer 18 exhibits a good step coverage. Employing ALCVD to form the gap layer 18 thus allows the resultant gap layer 18 to be uniform on an uneven surface.

Next, the nonmagnetic layer 17 and the gap layer 18, except portions thereof located near the medium facing surface 30, are selectively etched by IBE, for example. Next, the first layer 20A is formed on the gap layer 18 and the yoke layer 20B is formed on a region of the magnetic layer 160 away from the plane ABS. The first layer 20A and the yoke layer 20B may be formed by frame plating, or by making a magnetic layer through sputtering and then selectively etching this magnetic layer.

Figure 13A:
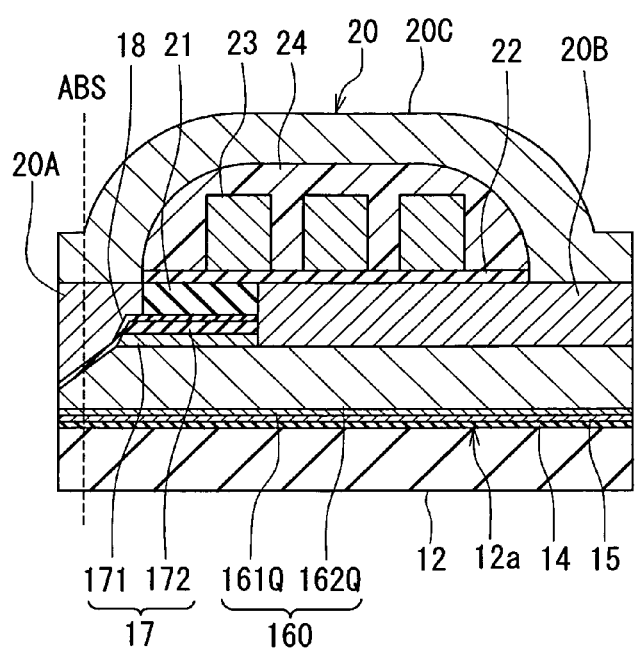
FIG. 13A and FIG. 13B are illustrative views showing a step that follows the step of FIG. 12A and FIG. 12B.
Figure 13B:
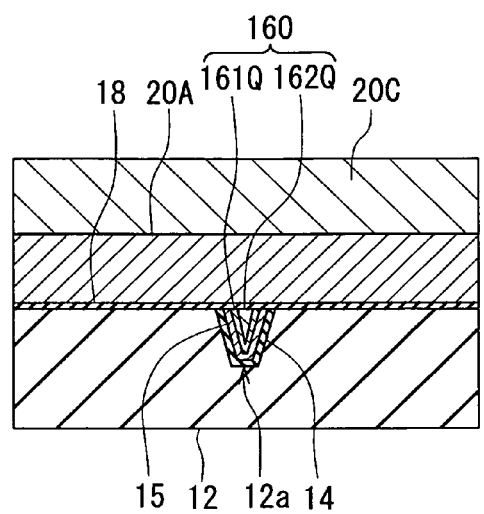

FIG. 13A and FIG. 13B show the next step. FIG. 13A shows a cross section of a stack of layers formed in the process of manufacture of the magnetic head, the cross section being perpendicular to the medium facing surface and the substrate. FIG. 13B shows a cross section of the stack of FIG. 13A taken at the imaginary plane ABS. In this step, first, the nonmagnetic layer 21 is formed over the entire top surface of the stack. Next, the nonmagnetic layer 21 is polished by, for example, CMP, until the first layer 20A and the yoke layer 20B become exposed, and the top surfaces of the first layer 20A, the yoke layer 20B and the nonmagnetic layer 21 are thereby planarized.

Next, the insulating layer 22 is formed on regions of the top surfaces of the yoke layer 20B and the nonmagnetic layer 21 above which the coil 23 is to be disposed. Next, the coil 23 is formed by, for example, frame plating, such that at least part of the coil 23 is disposed on the insulating layer 22. Next, the insulating layer 24 is formed to cover the coil 23. Next, the second layer 20C is formed by, for example, frame plating, to thereby complete the shield 20.

Next, as shown in FIG. 2, the protection layer 25 is formed to cover the entire top surface of the stack. Wiring, terminals and so on are then formed on the protection layer 25, the substrate 1 is cut at a position near the plane ABS, the surface formed as a result of this cutting is polished to thereby form the medium facing surface 30, and a process such as fabrication of flying rails is performed to thereby complete the magnetic head. When the medium facing surface 30 is formed, the magnetic layers 161Q and 162Q become the first layer 161 and the second layer 162, respectively, whereby the pole layer 16 is completed. In the present embodiment, the pole layer 16 is formed such that, in the groove 12a of the encasing layer 12, the nonmagnetic film 14 and the polishing stopper layer 15 are sandwiched between the encasing layer 12 and the pole layer 16.

The main functions and effects of the magnetic head of the present embodiment will now be described. In the magnetic head, the write head writes data on a recording medium while the read head reads data written on the recording medium. In the write head, the coil 23 generates a magnetic field that corresponds to data to be written on the recording medium. The pole layer 16 and the shield 20 form a magnetic path for passing a magnetic flux corresponding to the magnetic field generated by the coil 23. The pole layer 16 allows the magnetic flux corresponding to the magnetic field generated by the coil 23 to pass and generates a write magnetic field used for writing the data on the recording medium by means of the perpendicular magnetic recording system. The shield 20 takes in a disturbance magnetic field applied from outside the magnetic head to the magnetic head. It is thereby possible to prevent erroneous writing on the recording medium caused by the disturbance magnetic field intensively taken into the pole layer 16.

According to the present embodiment, in the medium facing surface 30, the end face of the shield 20 is located forward of the end face of the pole layer 16 along the direction T of travel of the recording medium (that is, located closer to the air outflow end of the slider), with a specific small distance provided therebetween by the gap layer 18. The position of an end of the bit pattern to be written on the recording medium is determined by the position of the end of the pole layer 16 that is closer to the gap layer 18 and located in the medium facing surface 30. The shield 20 takes in a magnetic flux that is generated from the end face of the pole layer 16 located in the medium facing surface 30 and that expands in directions except the direction perpendicular to the plane of the recording medium, so as to prevent this flux from reaching the recording medium. It is thereby possible to prevent a direction of magnetization of the bit pattern already written on the recording medium from being changed due to the effect of the above-mentioned flux. The present embodiment thus allows an improvement in linear recording density.

According to the present embodiment, as shown in FIG. 3, the end face of the pole layer 16 located in the medium facing surface 30, i.e., the end face of the track width defining portion 16A, has a width that decreases with decreasing distance from the first side A1, i.e., with decreasing distance from the substrate 1. This makes it possible to prevent the problems resulting from the skew.

A first and a second feature of the manufacturing method for the magnetic head of the present embodiment will now be described. The first feature is that, in the case where the nonmagnetic layer 12P is made of alumina ($Al_2O_3$), the step of forming the groove 12a in the nonmagnetic layer 12P includes the step of taper-etching the nonmagnetic layer 12P by RIE with an etching gas containing at least $BCl_3$ and $N_2$ among $BCl_3$, $Cl_2$ and $N_2$. $N_2$ is a gas for forming, during etching of the nonmagnetic layer 12P, a sidewall-protecting film on the sidewall of the groove formed by the etching. Using an etching gas containing $N_2$ serves to form the sidewall-protecting film on the sidewall of the groove during the etching of the nonmagnetic layer 12P, thereby serving to accomplish taper-etching of the nonmagnetic layer 12P.

A description will now be given on the results of a first experiment demonstrating that using an etching gas containing $N_2$ in the step of taper-etching the nonmagnetic layer 12P by RIE serves to accomplish taper-etching of the nonmagnetic layer 12P. For the first experiment, prepared were five samples each made up of the nonmagnetic layer 12P of alumina and the mask layers 13 and 33 formed thereon. In these samples, etching by RIE was performed on the nonmagnetic layer 12P with different types of etching gases, and the groove 12a was thereby formed in the nonmagnetic layer 12P. The different types of etching gases each contain $BCl_3$, $Cl_2$ and $N_2$. In the different of types of etching gases, the flow rate of $BCl_3$ was 80 sccm, the flow rate of $Cl_2$ was 15 sccm, and the flow rate of $N_2$ was set to five different values: 11 sccm, 12 sccm, 13.5 sccm, 14.5 sccm, and 16 sccm. In the first experiment, the source power was set to 1200 W, the high frequency bias power was set to 25 W, and the pressure in chamber was set to 0.3 Pa.

In the first experiment, after etching the nonmagnetic layer 12P in each of the five samples as above, the inclination angle of the sidewall of the portion of the groove 12a to accommodate the track width defining portion 16A was measured. Table 1 below and FIG. 14 show the relationship between the flow rate (sccm) of $N_2$ and the inclination angle (deg) of the sidewall obtained in the first experiment.

TABLE 1

| $N_2$ flow rate (sccm) | Inclination angle (deg) |
|---|---|
| 11 | 12.3 |
| 12 | 13.3 |
| 13.5 | 14 |
| 14.5 | 15.5 |
| 16 | 16.5 |

Figure 14:
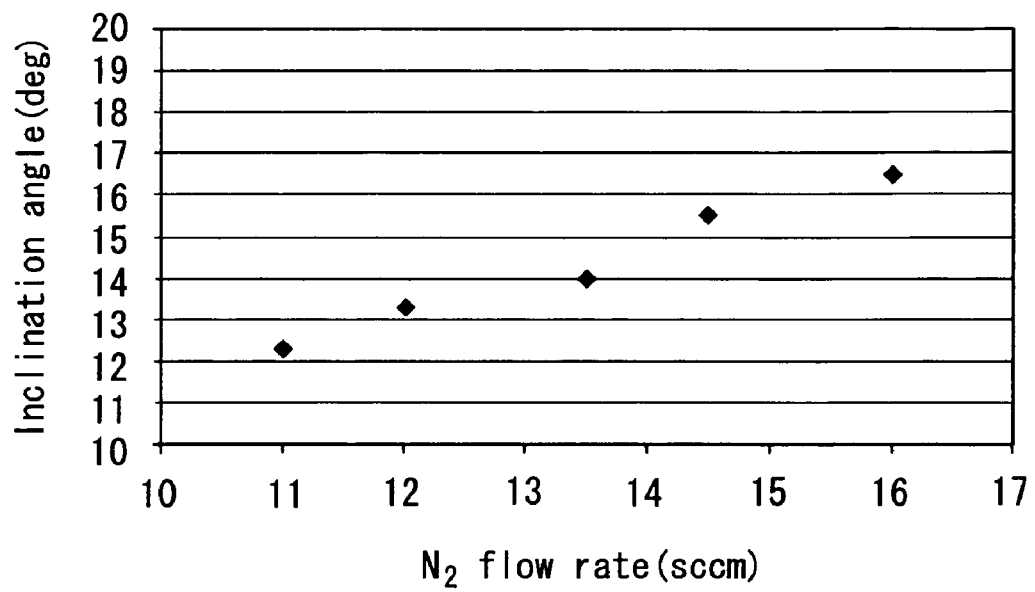
FIG. 14 is a plot showing the relationship between the flow rate of $N_2$ in the etching gas for RIE performed to form the groove of the encasing layer according to the manufacturing method for the magnetic head of the embodiment of the invention and the inclination angle of the sidewall of the groove.

Table 1 and FIG. 14 indicate that the inclination angle of the sidewall increases as the flow rate of $N_2$ increases. This shows that $N_2$ is a gas for forming, during etching of the nonmagnetic layer 12P, a sidewall-protecting film on the sidewall of the groove formed by the etching, and that the etching gas containing $N_2$ serves to accomplish taper-etching of the nonmagnetic layer 12P.

A description will now be given on the results of a second experiment performed to study the relationship between the high frequency bias power supplied when performing RIE to taper-etch the nonmagnetic layer 12P of alumina with an etching gas containing $BCl_3$, $Cl_2$ and $N_2$, and the inclination angle of the sidewall of the portion of the groove 12a to accommodate the track width defining portion 16A. For the second experiment, prepared were three samples each made up of the nonmagnetic layer 12P of alumina and the mask layers 13 and 33 formed thereon. In these samples, etching by RIE was performed on the nonmagnetic layer 12P with different levels of high frequency bias power, and the groove 12a was thereby formed. In the etching gas used in the second experiment, the flow rate of $BCl_3$ was 80 sccm, the flow rate of $Cl_2$ was 15 sccm, and the flow rate of $N_2$ was 14 sccm. In the second experiment, the source power was set to 1200 W, the high frequency bias power was set to three different levels: 20 W, 25 W and 30 W, and the pressure in chamber was set to 0.3 Pa.

In the second experiment, after etching the nonmagnetic layer 12P in each of the three samples as above, the inclination angle of the sidewall of the portion of the groove 12a to accommodate the track width defining portion 16A was measured. Table 2 below and FIG. 15 show the relationship between the high frequency bias power (W) and the inclination angle (deg) of the sidewall obtained in the second experiment.

TABLE 2

| High frequency bias power (W) | Inclination angle (deg) |
|---|---|
| 20 | 16.5 |
| 25 | 14.5 |
| 30 | 13 |

Figure 15:
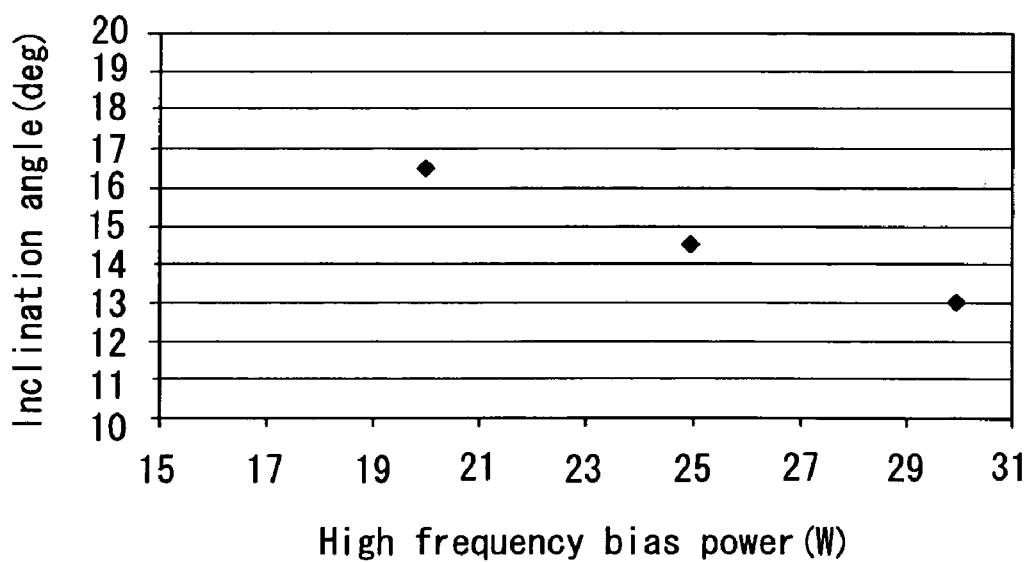
FIG. 15 is a plot showing the relationship between the high frequency bias power for RIE performed to form the groove of the encasing layer according to the manufacturing method for the magnetic head of the embodiment of the invention and the inclination angle of the sidewall of the groove.

Table 2 and FIG. 15 indicate that the inclination angle of the sidewall decreases as the high frequency bias power increases. The results of the first and second experiments indicate that, when the nonmagnetic layer 12P of alumina is taper-etched by RIE with an etching gas containing $N_2$, controlling at least the flow rate of $N_2$ and the high frequency bias power serves to control the inclination angle of the sidewall of the portion of the groove 12a to accommodate the track width defining portion 16A.

Figure 16:
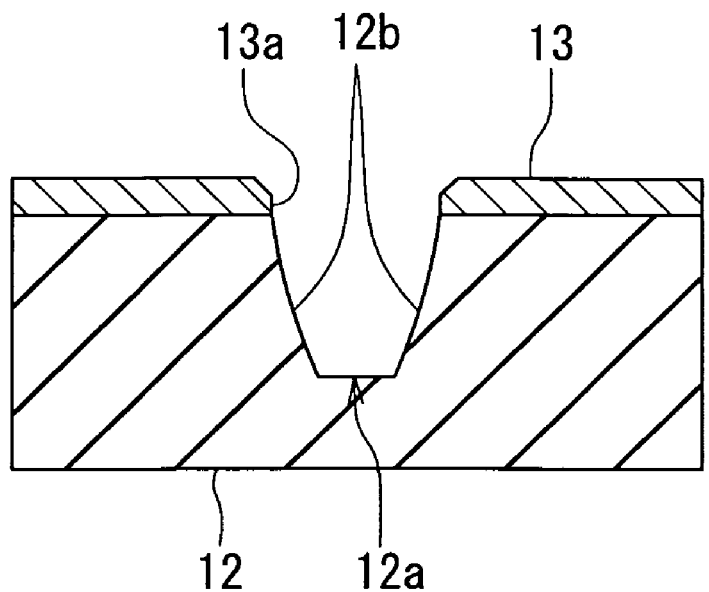
FIG. 16 is an illustrative view showing the shape of a groove formed by a groove-forming method of a first comparative example.
Figure 17:
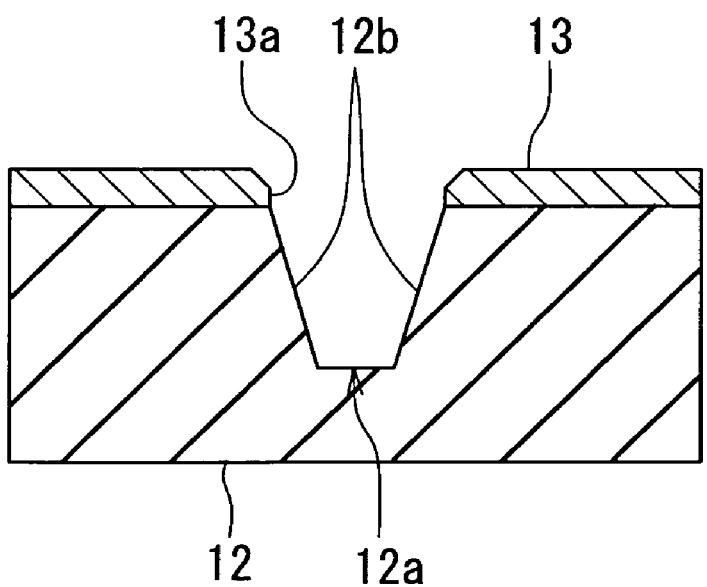
FIG. 17 is an illustrative view showing the shape of a groove formed by a groove-forming method of the embodiment of the invention.

Reference is now made to FIG. 16 and FIG. 17 to describe a difference in flatness of the sidewall of the portion of the groove 12a to accommodate the track width defining portion 16A between the case in which the nonmagnetic layer 12P made of alumina is taper-etched by RIE using an etching gas containing $CF_4$ as the gas for forming the sidewall-protecting film and the case in which the nonmagnetic layer 12P made of alumina is taper-etched by RIE using an etching gas containing $N_2$ as the gas for forming the sidewall-protecting film. FIG. 16 conceptually shows the shape of the portion of the groove 12a to accommodate the track width defining portion 16A obtained in the case where the groove 12a is formed by a groove-forming method of a first comparative example. The groove-forming method of the first comparative example is a method in which the nonmagnetic layer 12P made of alumina is taper-etched by RIE using an etching gas containing $CF_4$ as the gas for forming the sidewall-protecting film. FIG. 17 conceptually shows the shape of the portion of the groove 12a to accommodate the track width defining portion 16A obtained in the case where the groove 12a is formed by the groove-forming method of the present embodiment, that is, the method in which the nonmagnetic layer 12P made of alumina is taper-etched by RIE using an etching gas containing $N_2$ as the gas for forming the sidewall-protecting film.

As shown in FIG. 16, in the case where the nonmagnetic layer 12P made of alumina is taper-etched by RIE using an etching gas containing $CF_4$ as the gas for forming the sidewall-protecting film, the resultant sidewall 12b of the groove 12a is poor in flatness. This is presumably because the sidewall-protecting film of $AlF_3$ formed in this case is relatively thick and nonuniform. The poor flatness of the sidewall 12b of the groove 12a precludes precise control of the shape of the pole layer 16 to be formed in the groove 12a, and consequently makes it difficult to precisely control the track width and to improve the write characteristics.

As shown in FIG. 17, in the case where the nonmagnetic layer 12P made of alumina is taper-etched by RIE using an etching gas containing $N_2$ as the gas for forming the sidewall-protecting film as in the present embodiment, the resultant sidewall 12b of the groove 12a is higher in flatness compared with the case of using a $CF_4$-containing etching gas as the gas for forming the sidewall-protecting film. This is presumably because, when the nonmagnetic film 12P made of alumina is taper-etched by RIE using an $N_2$-containing etching gas, a BN film or AlN film formed as the sidewall-protecting film is thinner and uniform, compared with the $AlF_3$ film. Furthermore, the BN film or AlN film is resistant to etching by RIE performed with an etching gas containing at least $BCl_3$ and $N_2$ among $BCl_3$, $Cl_2$ and $N_2$. Consequently, according to the present embodiment, it is possible to make the inclination angle of the sidewall 12b of the groove 12a sufficiently great even if the sidewall-protecting film is formed in a small thickness on the sidewall 12b.

As thus described, the first feature of the manufacturing method for the magnetic head of the present embodiment makes it possible that, in the case where the nonmagnetic layer 12P is made of alumina, high flatness of the sidewall of the groove 12a is achieved by taper-etching the nonmagnetic layer 12P using an etching gas containing at least $BCl_3$ and $N_2$ among $BCl_3$, $Cl_2$ and $N_2$ in the step of taper-etching the nonmagnetic layer 12P by RIE. As a result, according to the present embodiment, it is possible to precisely form the pole layer 16 that is capable of preventing the problems resulting from the skew and capable of providing improved write characteristics.

The second feature of the manufacturing method for the magnetic head of the present embodiment will now be described. The second feature is to form the groove 12a in the nonmagnetic layer 12P in the following manner. Specifically, according to the present embodiment, as shown in FIG. 5A and FIG. 5B, the mask layer 13 is first formed on the nonmagnetic layer 12P that will become the encasing layer 12 as a result of the formation of the groove 12a. The mask layer 13 has the opening 13a that penetrates and that has a shape corresponding to the plane geometry of the groove 12a to be formed later. The etching rate for the mask layer 13 in RIE to be performed later on the nonmagnetic layer 12P is lower than that for the nonmagnetic layer 12P. Next, as shown in FIG. 6A and FIG. 6B, the mask layer 33 is formed on the mask layer 13. The mask layer 33 has the opening 33a that penetrates and that is wider than the opening 13a. The mask layer 33 is formed on the mask layer 13 such that the opening 13a is exposed from the opening 33a. Next, the groove 12a is formed in the nonmagnetic layer 12P so that the nonmagnetic layer 12P becomes the encasing layer 12. The step of forming the groove 12a includes the step of taper-etching a portion of the nonmagnetic layer 12P exposed from the openings 13a and 33a by RIE so that at least the portion of the groove 12a to accommodate the track width defining portion 16A is formed in the nonmagnetic layer 12P.

Figure 18A:
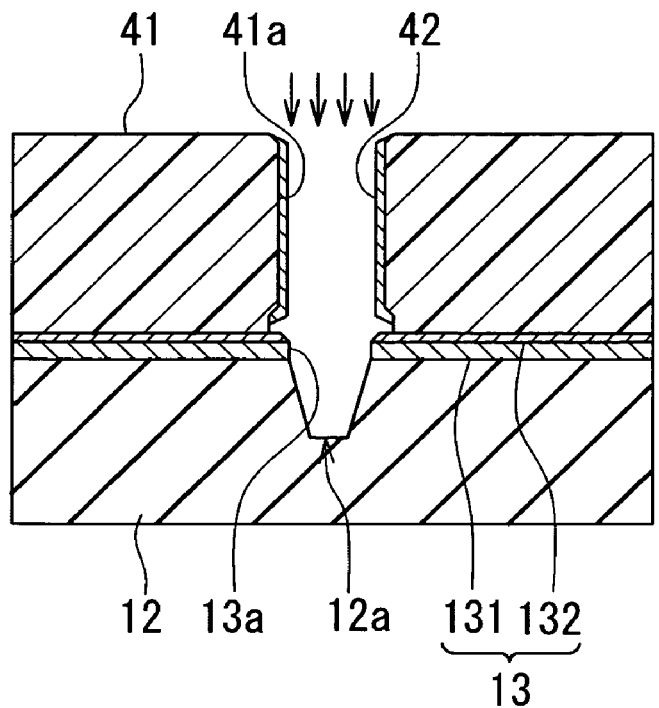
FIG. 18A and FIG. 18B are illustrative views showing a groove-forming method of a second comparative example.
Figure 18B:
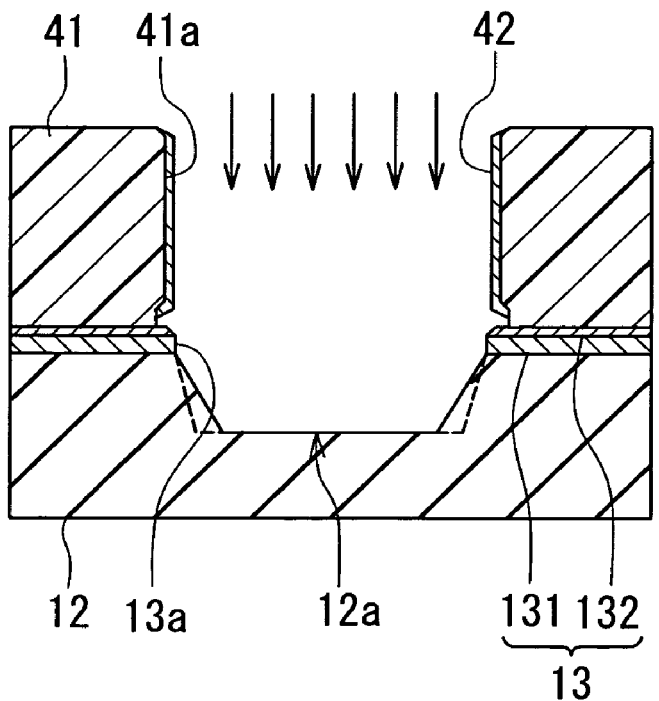

Reference is now made to FIG. 18A and FIG. 18B to describe a groove-forming method of a second comparative example. FIG. 18A and FIG. 18B are illustrative views showing the groove-forming method of the second comparative example. FIG. 18A shows a cross section of the portion of the groove to accommodate the track width defining portion of the pole layer. FIG. 18B shows a cross section of the portion of the groove to accommodate the wide portion of the pole layer.

According to the groove-forming method of the second comparative example, first, a first film and a second film that will later become the first layer 131 and the second layer 132 of the mask layer 13, respectively, are formed in this order on the nonmagnetic layer 12P. Next, a photoresist layer having a thickness of, for example, 1.0 μm, is formed on the second film. This photoresist layer is then patterned by photolithography to thereby form a photoresist mask 41 to be used for forming the groove 12a of the encasing layer 12. The photoresist mask 41 has an opening 41a that has a shape corresponding to the plane geometry of the groove 12a to be formed later. Next, the first and second films are selectively etched by, for example, IBE, using the photoresist mask 41. As a result, the first film becomes the first layer 131 and the second film becomes the second layer 132, whereby the mask layer 13 having the penetrating opening 13a is formed. The opening 13a has a shape corresponding to the plane geometry of the groove 12a to be formed later. Numeral 42 in FIG. 18A and FIG. 18B indicates a deposition layer formed by substances that flew off due to the etching of the first and second films and have adhered to the sidewall of the opening 41a of the photoresist mask 41. According to the groove-forming method of the second comparative example, next, the groove 12a is formed in the nonmagnetic layer 12P by taper-etching the nonmagnetic layer 12P by RIE using the photoresist mask 41 and the mask layer 13 as a mask.

According to the groove-forming method of the second comparative example, the opening 41a of the photoresist mask 41 used for etching the nonmagnetic layer 12P is smaller in width at the portion thereof corresponding to the track width defining portion 16A of the pole layer 16 than at the portion thereof corresponding to the wide portion 16B of the pole layer 16. As a result, at the portion of the groove 12a to accommodate the track width defining portion 16A of the pole layer 16, the supply of the etching gas is insufficient and consequently the sidewall-protecting film cannot be sufficiently deposited, which results in a smaller inclination angle of the sidewall. In contrast, at the portion of the groove 12a to accommodate the wide portion 16B of the pole layer 16, the supply of the etching gas is sufficient and consequently the sidewall-protecting film can be sufficiently deposited, which results in a greater inclination angle of the sidewall.

Consequently, according to the groove-forming method of the second comparative example, if the etching conditions are determined so that a desired inclination angle of the sidewall can be obtained at the portion of the groove 12a to accommodate the track width defining portion 16A of the pole layer 16, the inclination angle of the sidewall obtained at the portion of the groove 12a to accommodate the wide portion 16B of the pole layer 16 becomes much greater than the desired angle. In FIG. 18 the broken line indicates the position of the sidewall where the inclination angle of the sidewall would be equal to the desired angle. According to the groove-forming method of the second comparative example, if the nonmagnetic layer 12P is etched such that the inclination angle of the sidewall of the portion of the groove 12a to accommodate the track width defining portion 16A of the pole layer 16 will be 12 degrees, for example, the inclination angle of the sidewall of the portion of the groove 12a to accommodate the wide portion 16B of the pole layer 16 becomes approximately 17 degrees.

If the inclination angle of the sidewall becomes much greater than a desired angle at the portion of the groove 12a to accommodate the wide portion 16B of the pole layer 16, the cross section of the wide portion 16B of the pole layer 16 perpendicular to the direction in which magnetic flux flows will become small in area, which will result in degradation of write characteristics such as overwrite property.

In contrast, according to the present embodiment, as shown in FIG. 6B, the mask layer 33 having the penetrating opening 33a wider than the opening 13a of the mask layer 13 is formed on the mask layer 13 such that the opening 13a is exposed from the opening 33a. Subsequently, the portion of the nonmagnetic layer 12P exposed from the openings 13a and 33a is taper-etched by RIE so that at least the portion of the groove 12a to accommodate the track width defining portion 16A is formed. According to the present embodiment, a sufficient supply of the etching gas is secured not only at the portion of the groove 12a to accommodate the wide portion 16B of the pole layer 16 but also at the portion of the groove 12a to accommodate the track width defining portion 16A of the pole layer 16. This makes it possible that, at the portion of the groove 12a to accommodate the wide portion 16B of the pole layer 16, the inclination angle of the sidewall is prevented from becoming much greater than a desired angle. According to the present embodiment, if the nonmagnetic layer 12P is etched such that the inclination angle of the sidewall of the portion of the groove 12a to accommodate the track width defining portion 16A will be 12 degrees, for example, the inclination angle of the sidewall of the portion of the groove 12a to accommodate the wide portion 16B becomes approximately 13 degrees. From the foregoing, the second feature of the manufacturing method for the magnetic head of the embodiment makes it possible to precisely form a pole layer that is capable of preventing the problems resulting from the skew and capable of providing improved write characteristics.

If the nonmagnetic layer 12P is etched by RIE without the mask layer 33 but with only the mask layer 13 used as a mask, the entire top surface of the mask layer 13 will undergo etching. Consequently, in this case, compared with the case where the mask layer 33 is present on the mask layer 13, substances flying off due to the etching of the mask layer 13 are much greater in amount, and the substances adhere to the sidewall of the groove 12a and thereby degrade the profile of the sidewall. Furthermore, if the nonmagnetic layer 12P is etched by RIE without the mask layer 33 but with only the mask layer 13 used as a mask, the second layer 132 of the mask layer 13 will be entirely removed, so that the nonmagnetic film 14 to be formed later will have lower adhesion to the mask layer 13.

In contrast, according to the present embodiment, the top surface of the mask layer 13 is mostly covered with the mask layer 33 when the nonmagnetic layer 12P is etched by RIE. Consequently, according to the present embodiment, it is possible to prevent the substances flying off due to the etching of the mask layer 13 from adhering to the sidewall of the groove 12a and thereby degrading the profile of the sidewall, and it is also possible to prevent the nonmagnetic film 14, which will be formed later, from suffering degradation in adhesion to the mask layer 13.

If the distance W1 between the edge of the opening 13a and the edge of the opening 33a is too small, the etching gas cannot be sufficiently supplied to the portion of the groove 12a to accommodate the track width defining portion 16A of the pole layer 16. If the distance W1 between the edge of the opening 13a and the edge of the opening 33a is too great, the amount of substances flying off due to the etching of the mask layer 13 increases, so that the substances adhere to the sidewall of the groove 12a and thereby degrade the profile of the sidewall. In addition, the region of the second layer 132 of the mask layer 13 that undergoes etching increases in area, so that the nonmagnetic film 14 to be formed later will have lower adhesion to the mask layer 13. In consideration of these, it is preferred that the distance W1 between the edge of the opening 13a and the edge of the opening 33a be within a range of 0.1 to 0.3 μm.

The first feature and the second feature of the manufacturing method for the magnetic head of the present embodiment each independently exhibit the respective advantageous effects described above. However, having the first and second features in combination is more effective for precisely forming a pole layer capable of preventing the problems resulting from the skew and capable of providing improved write characteristics.

Other functions and effects of the magnetic head of the embodiment will now be described. In the present embodiment, the top surface of the pole layer 16 includes: the first portion 16T having the first edge E1 located in the medium facing surface 30 and the second edge E2 opposite thereto; and the second portion 16T2 located farther from the medium facing surface 30 than the first portion 16T1 and connected to the first portion 16T1 at the second edge E2. The first edge E1 coincides with the second side A2 of the end face of the pole layer 16, the second side A2 defining the track width. The distance from the substrate 1 to any point on the first portion 16T1 increases with increasing distance from the medium facing surface 30 to the point. According to the present embodiment, such a shape of the pole layer 16 allows a reduction in thickness of the pole layer 16 taken in the medium facing surface 30, which makes it possible to prevent the problems resulting from the skew and to introduce magnetic flux of great magnitude to the medium facing surface 30 through the pole layer 16. As a result, it is possible to improve write characteristics such as overwrite property.

According to the present embodiment, in the vicinity of the medium facing surface 30 the cross-sectional area of the pole layer 16 perpendicular to the direction in which magnetic flux flows is greater as compared with a case where the thickness of the pole layer is uniform in a region from the medium facing surface 30 to a specific point as seen in the direction perpendicular to the medium facing surface 30. Consequently, the present embodiment allows magnetic flux of greater magnitude to pass through the pole layer 16 in the vicinity of the medium facing surface 30. It is thereby possible to improve write characteristics such as overwrite property.

According to the present embodiment, the nonmagnetic layer 17 is disposed on the second portion 16T2 of the top surface of the pole layer 16. The nonmagnetic layer 17 has a bottom surface touching the second portion 16T2, and this bottom surface has the edge E3 located at the second edge E2. The position of the second edge E2 has an influence on the write characteristics of the magnetic head. It is therefore important to precisely control the position of the second edge E2. According to the present embodiment, by etching the magnetic layer 160 using the nonmagnetic layer 17 remaining on the second portion 16T2 of the top surface 16T of the pole layer 16 as a mask, the position of the second edge E2 is defined by the edge E3 of the bottom surface of the nonmagnetic layer 17. According to the embodiment, it is possible to control the position of the second edge E2 with higher precision as compared with a case where the position of the second edge E2 is defined by etching the magnetic layer 160 using a mask made of photoresist, instead of the nonmagnetic layer 17.

Furthermore, according to the present embodiment, the first layer 20A of the shield 20 has the bottom surface touching the gap layer 18. The bottom surface of the first layer 20A bends to be opposed to the pole layer 16 and the nonmagnetic layer 17 with the gap layer 18 located in between. The distance between the bottom surface of the first layer 20A and the second portion 16T2 is greater than the distance between the bottom surface of the first layer 20A and the first portion 16T1. In the present embodiment, the throat height TH is not defined by an end of the first layer 20A farther from the medium facing surface 30, but is defined by the position of the edge E3 of the bottom surface of the nonmagnetic layer 17. As a result, it is possible to reduce the throat height TH while making the volume of the first layer 20A sufficiently high. Furthermore, the position of the edge E3 that defines the throat height TH can be determined with precision. Consequently, according to the embodiment, it is possible to precisely control throat height TH of a small value. The foregoing features of the embodiment make it possible to improve the overwrite property and to increase the speed of response of a write magnetic field to a change in current fed to the coil 23 even if the current is of a small value.

In the pole layer 16, flux leakage from the pole layer 16 is likely to occur in the vicinity of the second edge E2 of the top surface. If the leakage flux reaches the medium facing surface 30 and further leaks to the outside from the medium facing surface 30, the effective track width may increase and the problems resulting from the skew may occur. In the present embodiment, the shield 20 has a portion located between the second edge E2 and the medium facing surface 30. As a result, the magnetic flux leaking from the vicinity of the second edge E2 in the pole layer 16 is taken in by the shield 20. This makes it possible to prevent a magnetic flux that leaks halfway through the pole layer 16 from further leaking to the outside from the medium facing surface 30.

In the present embodiment, the top surface of the pole layer 16 bends near the medium facing surface 30. This makes it possible to suppress formation of residual magnetization in the direction perpendicular to the medium facing surface 30 in a portion of the pole layer 16 near the medium facing surface 30 after a writing operation. As a result, according to the embodiment, it is possible to suppress the occurrence of a phenomenon in which data stored on a recording medium is erased due to residual magnetization in the pole layer 16 after a writing operation.

In the present embodiment, the pole layer 16 is disposed in the groove 12a of the encasing layer 12 made of a nonmagnetic material, with the nonmagnetic film 14 and the polishing stopper layer 15 disposed between the pole layer 16 and the groove 12a. The width of the pole layer 16 is therefore smaller than that of the groove 12a. This makes it easy to form the groove 12a and to reduce the width of the pole layer 16 and the width of the top surface of the track width defining portion 16A that defines the track width, in particular. As a result, according to the embodiment, it is possible to easily implement a track width that is smaller than the minimum track width that can be formed by photolithography, and to control the track width with accuracy.

The present invention is not limited to the foregoing embodiment but can be carried out in various modifications. For example, in the foregoing embodiment, the planar spiral-shaped coils 9 and 23 may be replaced with a coil helically wound around the pole layer 16.

While the foregoing embodiment has been described with reference to a magnetic head having a structure in which the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A method of manufacturing a magnetic head for perpendicular magnetic recording, the magnetic head comprising:
   a medium facing surface that faces toward a recording medium;
   a coil that generates a magnetic field corresponding to data to be written on the recording medium;
   a pole layer that allows a magnetic flux corresponding to the magnetic field generated by the coil to pass and generates a write magnetic field for writing the data on the recording medium by means of a perpendicular magnetic recording system;
   an encasing layer made of a nonmagnetic material and having a groove that opens at a top surface of the encasing layer and that accommodates the pole layer; and
   a substrate on which the encasing layer, the pole layer and the coil are stacked, wherein:
   the pole layer includes a track width defining portion having an end face that is located in the medium facing surface and that defines a track width;
   the end face of the track width defining portion located in the medium facing surface has a width that decreases with decreasing distance from the substrate; and
   the groove of the encasing layer includes a portion to accommodate the track width defining portion, and this portion of the groove has a width that decreases with decreasing distance from the substrate,
   the method comprising the steps of:
   forming a nonmagnetic layer that will later undergo formation of the groove therein and will thereby become the encasing layer;
   forming a mask layer on the nonmagnetic layer, the mask layer having an opening that penetrates and that has a shape corresponding to a plane geometry of the groove to be formed later, the mask layer being formed of a nonmagnetic metal material and being lower in etching rate than the nonmagnetic layer in reactive ion etching to be performed later on the nonmagnetic layer;

forming the groove in the nonmagnetic layer so that the nonmagnetic layer becomes the encasing layer;

forming the pole layer such that the pole layer is accommodated in the groove of the encasing layer; and forming the coil, wherein:

the nonmagnetic layer is formed of $Al_2O_3$; and the step of forming the groove in the nonmagnetic layer includes the step of taper-etching the nonmagnetic layer by reactive ion etching using the mask layer with an etching gas containing at least $BCl_3$ and $N_2$ among $BCl_3$, $Cl_2$ and $N_2$ so that at least the portion of the groove of the encasing layer to accommodate the track width defining portion is formed in the nonmagnetic layer.

2. The method according to claim 1, wherein, in the etching gas, proportions of flow rates of $BCl_3$, $Cl_2$, and $N_2$ with respect to an entire flow rate are 70-95%, 0-30%, and 5-20%, respectively.

3. A method of manufacturing a magnetic head for perpendicular magnetic recording, the magnetic head comprising:
a medium facing surface that faces toward a recording medium;
a coil that generates a magnetic field corresponding to data to be written on the recording medium;
a pole layer that allows a magnetic flux corresponding to the magnetic field generated by the coil to pass and generates a write magnetic field for writing the data on the recording medium by means of a perpendicular magnetic recording system;
an encasing layer made of a nonmagnetic material and having a groove that opens at a top surface of the encasing layer and that accommodates the pole layer; and
a substrate on which the encasing layer, the pole layer and the coil are stacked, wherein:
the pole layer includes: a track width defining portion having an end face that is located in the medium facing surface and that defines a track width, and having an end opposite to the end face; and a wide portion connected to the end of the track width defining portion and having a width greater than that of the track width defining portion;
the end face of the track width defining portion located in the medium facing surface has a width that decreases with decreasing distance from the substrate; and
the groove of the encasing layer includes a portion to accommodate the track width defining portion, and this portion of the groove has a width that decreases with decreasing distance from the substrate,
the method comprising the steps of:

forming a nonmagnetic layer that will later undergo formation of the groove therein and will thereby become the encasing layer;

forming a first mask layer on the nonmagnetic layer, the first mask layer having a first opening that penetrates and that has a shape corresponding to a plane geometry of the groove to be formed later, the first mask layer being formed of a nonmagnetic metal material and being lower in etching rate than the nonmagnetic layer in reactive ion etching to be performed later on the nonmagnetic layer;

forming a second mask layer on the first mask layer, the second mask layer having a second opening that penetrates and that is wider than the first opening, the second mask layer being formed such that the first opening is exposed from the second opening;

forming the groove in the nonmagnetic layer so that the nonmagnetic layer becomes the encasing layer;

forming the pole layer such that the pole layer is accommodated in the groove of the encasing layer; and forming the coil, wherein the step of forming the groove in the nonmagnetic layer includes the step of taper-etching a portion of the nonmagnetic layer exposed from the first and second openings by reactive ion etching so that at least the portion of the groove of the encasing layer to accommodate the track width defining portion is formed in the nonmagnetic layer wherein the nonmagnetic layers is formed of $Al_2O_3$ and an etching gas containing at least $BCl_3$ and $N_2$ among $BCl_3$, $Cl_2$ and $N_2$ is used in the step of taper-etching.

4. The method according to claim 3, wherein a distance between an edge of the first opening and an edge of the second opening is within a range of 0.1 to 0.3mm.

5. The method according to claim 3, wherein, in the etching gas, proportions of flow rates of $BCl_3$, $Cl_2$, and $N_2$ with respect to an entire flow rate are 70-95%, 0-30%, and 5-20%, respectively.

6. The method according to claim 3, wherein:
the first mask layer includes a first layer and a second layer that are stacked in this order on the nonmagnetic layer; and
a portion of the second layer exposed from the second opening is etched in the step of taper-etching.

7. The method according to claim 6, further comprising the step of removing the second mask layer after the groove is formed, and the step of forming a nonmagnetic film made of a nonmagnetic material in the groove and on the first mask layer after removing the second mask layer but before forming the pole layer, wherein, in the step of forming the pole layer, the pole layer is formed such that the nonmagnetic film is sandwiched between the encasing layer and the pole layer in the groove.

\* \* \* \* \*